(12) United States Patent
Abedini et al.

(10) Patent No.: US 11,451,995 B2
(45) Date of Patent: Sep. 20, 2022

(54) NETWORK-ASSISTED SELF-MEASUREMENTS TO ENABLE FULL-DUPLEX OPERATION

(71) Applicant: QUALCOMM Incorporated, San Diego, CA (US)

(72) Inventors: Navid Abedini, Basking Ridge, NJ (US); Kapil Gulati, Belle Mead, NJ (US); Andrzej Partyka, Bedminster, NJ (US); Junyi Li, Franklin Park, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 17/154,258

(22) Filed: Jan. 21, 2021

(65) Prior Publication Data

US 2021/0235301 A1 Jul. 29, 2021

Related U.S. Application Data

(60) Provisional application No. 62/965,125, filed on Jan. 23, 2020.

(51) Int. Cl.
*H04W 24/10* (2009.01)
*H04W 72/04* (2009.01)
*H04L 5/00* (2006.01)

(52) U.S. Cl.
CPC ........... *H04W 24/10* (2013.01); *H04L 5/0048* (2013.01); *H04W 72/042* (2013.01); *H04W 72/0413* (2013.01)

(58) Field of Classification Search
CPC ............. H04W 24/10; H04W 72/0413; H04W 72/042; H04L 5/0048
See application file for complete search history.

(56) References Cited

U.S. PATENT DOCUMENTS

| | | | |
|---|---|---|---|
| 2012/0157085 A1* | 6/2012 | Iwamura | H04W 36/0058 |
| 2017/0054544 A1 | 2/2017 | Kazmi et al. | |
| 2018/0083679 A1 | 3/2018 | Lim et al. | |
| 2019/0140811 A1 | 5/2019 | Abedini et al. | |

OTHER PUBLICATIONS

International Search Report and Written Opinion—PCT/US2021/014727—ISA/EPO—dated May 7, 2021 (201487WO).

* cited by examiner

*Primary Examiner* — Ronald B Abelson
(74) *Attorney, Agent, or Firm* — Holland & Hart LLP

(57) ABSTRACT

Methods, systems, and devices for wireless communications are described. A first wireless device may receive a measurement configuration, from a second wireless device, to support full-duplex operation using a shared resource. The first wireless device may transmit, via the shared resource, a first signal via a first transmission beam using a first antenna array of the first wireless device. The first wireless device may monitor, in accordance with the measurement configuration, the shared resource using a first receive beam via a second antenna array of the first wireless device. The first wireless device may then transmit a measurement report to a second wireless device based on the monitoring. The second wireless device may transmit, to the first wireless device, a duplexing configuration configuring the full-duplex operation of the first wireless device based on the measurement report.

59 Claims, 16 Drawing Sheets

NETWORK-ASSISTED SELF-MEASUREMENTS TO ENABLE FULL-DUPLEX OPERATION

CROSS REFERENCE

The present Application for Patent claims the benefit of U.S. Provisional patent Application No. 62/965,125 by ABEDINI, et al., entitled "NETWORK-ASSISTED SELF-MEASUREMENTS TO ENABLE FULL-DUPLEX OPERATION," filed Jan. 23, 2020, assigned to the assignee hereof, and expressly incorporated herein.

FIELD OF TECHNOLOGY

The following relates generally to wireless communications and more specifically to network-assisted self-measurements to enable full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless device may operate in a full-duplex mode, which may involve transmitting and receiving at the same time and over the same resources. Full-duplex communications may lead to self-interference (SI), where signals transmitted by the device may interfere with reception of signals by the device.

SUMMARY

The described techniques relate to improved methods, systems, devices, and apparatuses that support network-assisted self-measurements to enable full-duplex operation. Generally, the described techniques provide for decreasing self-interference (SI) experienced at a user equipment (UE) by performing network assisted self-measurements. A UE may transmit and receive signals in a full-duplex communication configuration. The UE may experience SI due to signals transmitted by the UE at a transmit antenna array interfering with signal reception by the UE at a receive antenna array. To avoid and decrease SI, the UE may perform network assisted self-measurement techniques. The UE may receive a measurement configuration, from a second wireless device such as a base station, to support full-duplex operation using a shared resource. The UE may transmit, via the shared resource, a first signal via a first transmission beam using a first antenna array of the first wireless device. The UE device may monitor, in accordance with the measurement configuration, the shared resource using a first receive beam via a second antenna array of the UE. The UE may then transmit a measurement report to a second wireless device based on the monitoring. The base station may transmit, to the UE, a duplexing configuration configuring the full-duplex operation of the UE based on the measurement report.

A method for wireless communications by a first wireless device is described. The method may include receiving a measurement configuration to support full duplex operation using a shared resource, transmitting, via the shared resource, a first signal via a first transmission beam using a first antenna array of the first wireless device, monitoring, in accordance with the measurement configuration, the shared resource using a first receive beam via a second antenna array of the first wireless device, and communicating with a second wireless device based on the monitoring.

An apparatus for wireless communications by a first wireless device is described. The apparatus may include a processor, memory coupled with the processor, and instructions stored in the memory. The instructions may be executable by the processor to cause the apparatus to receive a measurement configuration to support full duplex operation using a shared resource, transmit, via the shared resource, a first signal via a first transmission beam using a first antenna array of the first wireless device, monitor, in accordance with the measurement configuration, the shared resource using a first receive beam via a second antenna array of the first wireless device, and communicate with a second wireless device based on the monitoring.

Another apparatus for wireless communications by a first wireless device is described. The apparatus may include means for receiving a measurement configuration to support full duplex operation using a shared resource, means for transmitting, via the shared resource, a first signal via a first transmission beam using a first antenna array of the first wireless device, means for monitoring, in accordance with the measurement configuration, the shared resource using a first receive beam via a second antenna array of the first wireless device, and means for communicating with a second wireless device based on the monitoring.

A non-transitory computer-readable medium storing code for wireless communications by a first wireless device is described. The code may include instructions executable by a processor to receive a measurement configuration to support full duplex operation using a shared resource, transmit, via the shared resource, a first signal via a first transmission beam using a first antenna array of the first wireless device, monitor, in accordance with the measurement configuration, the shared resource using a first receive beam via a second antenna array of the first wireless device, and communicate with a second wireless device based on the monitoring.

In some examples of the method, apparatuses, and non-transitory computer-readable medium described herein, the communicating may include operations, features, means, or instructions for transmitting a measurement report to the second wireless device based on the monitoring.

Some examples of the method, apparatuses, and non-transitory computer-readable medium described herein may further include operations, features, means, or instructions for receiving a duplexing configuration configuring the full duplex operation of the first wireless device based on the measurement report and communicating, via the shared resource, via the first antenna array and the second antenna array based on the duplexing configuration.

In some examples of the method, apparatuses, and non-transitory computer-readable medium described herein, receiving the duplexing configuration may include operations, features, means, or instructions for receiving the duplexing configuration indicating at least one condition, at least one configuration, or both, in which the first wireless device may be to support the full duplex operation.

In some examples of the method, apparatuses, and non-transitory computer-readable medium described herein, receiving the duplexing configuration may include operations, features, means, or instructions for receiving the duplexing configuration indicating at least one transmission-receive beam pair on which the first wireless device may be to support the full duplex operation.

In some examples of the method, apparatuses, and non-transitory computer-readable medium described herein, receiving the duplexing configuration may include operations, features, means, or instructions for receiving the duplexing configuration indicating at least one condition, at least one configuration, or both, on which the first wireless device may be to support the full duplex operation using the at least one transmission-receive beam pair.

In some examples of the method, apparatuses, and non-transitory computer-readable medium described herein, receiving the duplexing configuration may include operations, features, means, or instructions for receiving the duplexing configuration indicating at least one transmission-receive beam pair on which the first wireless device may be not to support the full duplex operation.

In some examples of the method, apparatuses, and non-transitory computer-readable medium described herein, transmitting the first signal may include operations, features, means, or instructions for transmitting the first signal that may be a reference signal, a synchronization signal, a control transmission, a data transmission, or any combination thereof.

In some examples of the method, apparatuses, and non-transitory computer-readable medium described herein, transmitting the first signal may include operations, features, means, or instructions for transmitting the first signal using a transmission power indicated in the measurement configuration.

In some examples of the method, apparatuses, and non-transitory computer-readable medium described herein, transmitting the first signal may include operations, features, means, or instructions for transmitting the first signal using the first transmission beam having a beam direction indicated in the measurement configuration.

In some examples of the method, apparatuses, and non-transitory computer-readable medium described herein, transmitting the first signal may include operations, features, means, or instructions for transmitting the first signal using the first transmission beam having a beam direction pointed in a direction of a reflector.

In some examples of the method, apparatuses, and non-transitory computer-readable medium described herein, monitoring the shared resource may include operations, features, means, or instructions for monitoring, in accordance with the measurement configuration, the shared resource using the first receive beam having a beam direction pointed in a direction of a reflector.

In some examples of the method, apparatuses, and non-transitory computer-readable medium described herein, monitoring the shared resource may include operations, features, means, or instructions for monitoring, in accordance with the measurement configuration, the shared resource using a set of multiple receive beams via the second antenna array.

In some examples of the method, apparatuses, and non-transitory computer-readable medium described herein, the set of multiple receive beams corresponds to an active link or a link scheduled to be active within a defined time duration.

Some examples of the method, apparatuses, and non-transitory computer-readable medium described herein may further include operations, features, means, or instructions for transmitting a configuration request to the second wireless device, where the measurement configuration may be based on the configuration request.

In some examples of the method, apparatuses, and non-transitory computer-readable medium described herein, transmitting the configuration request may include operations, features, means, or instructions for transmitting the configuration request indicating a resource request, a number of beams, or both.

In some examples of the method, apparatuses, and non-transitory computer-readable medium described herein, receiving the measurement configuration may include operations, features, means, or instructions for receiving the measurement configuration that indicates a periodic resource set that indicates the shared resource as a periodic shared resource.

In some examples of the method, apparatuses, and non-transitory computer-readable medium described herein, receiving the measurement configuration may include operations, features, means, or instructions for receiving the measurement configuration indicating a self-measurement gap in which the first wireless device may be scheduled to monitor a signal within the self-measurement gap.

In some examples of the method, apparatuses, and non-transitory computer-readable medium described herein, receiving the measurement configuration may include operations, features, means, or instructions for receiving the measurement configuration indicating the self-measurement gap that may be a periodic self-measurement gap, a semi-static self-measurement gap, a dynamic self-measurement gap, an event-triggered self-measurement gap, or any combination thereof.

In some examples of the method, apparatuses, and non-transitory computer-readable medium described herein, receiving the measurement configuration may include operations, features, means, or instructions for receiving the measurement configuration indicating a frequency division multiplexing configuration, a code division multiplexing configuration, or both, for the shared resource.

In some examples of the method, apparatuses, and non-transitory computer-readable medium described herein, communicating with the second wireless device may include operations, features, means, or instructions for transmitting a measurement report indicating a downlink reference signal measurement, a reference signal measurement, or both, based on the frequency division multiplexing configuration, the code division multiplexing configuration, or both, for the shared resource.

In some examples of the method, apparatuses, and non-transitory computer-readable medium described herein, communicating with the second wireless device may include operations, features, means, or instructions for transmitting a measurement report that may be a periodic measurement report, a semi-static measurement report, a dynamically-generated measurement report, an event triggered measurement report, or any combination thereof.

In some examples of the method, apparatuses, and non-transitory computer-readable medium described herein, communicating with the second wireless device may include operations, features, means, or instructions for transmitting a measurement report that indicates at least one measurement value.

In some examples of the method, apparatuses, and non-transitory computer-readable medium described herein, the at least one measurement value may be a received signal strength indicator value, a reference signal receive power value, a signal to interference plus noise value, a channel quality indicator value, a clutter echo delay value, or any combination thereof.

In some examples of the method, apparatuses, and non-transitory computer-readable medium described herein, the first wireless device may be one of a user equipment or a child integrated access and backhaul (IAB) node and the second wireless device may be one of a base station or a parent IAB node.

Some examples of the method, apparatuses, and non-transitory computer-readable medium described herein may further include operations, features, means, or instructions for receiving, from the base station, control signaling allocating a resource for uplink transmission, downlink transmission and communicating the uplink transmission, downlink transmission, or both, within the resource based on the control signaling.

In some examples of the method, apparatuses, and non-transitory computer-readable medium described herein, the first wireless device may be an IAB node and the second wireless device may be a central unit.

Some examples of the method, apparatuses, and non-transitory computer-readable medium described herein may further include operations, features, means, or instructions for receiving, from the central unit, control signaling allocating a resource for scheduling by the IAB node and scheduling uplink transmission, downlink transmission, or both, within the resource.

Some examples of the method, apparatuses, and non-transitory computer-readable medium described herein may further include operations, features, means, or instructions for generating a cross link interference measurement for the shared resource based on the monitoring.

Some examples of the method, apparatuses, and non-transitory computer-readable medium described herein may further include operations, features, means, or instructions for transmitting a measurement report indicating the cross link interference measurement.

Some examples of the method, apparatuses, and non-transitory computer-readable medium described herein may further include operations, features, means, or instructions for generating a reference signal measurement for the shared resource based on the monitoring.

Some examples of the method, apparatuses, and non-transitory computer-readable medium described herein may further include operations, features, means, or instructions for transmitting a measurement report indicating the reference signal measurement.

In some examples of the method, apparatuses, and non-transitory computer-readable medium described herein, the reference signal measurement may be a channel state information reference signal measurement.

A method for wireless communications by a first wireless device is described. The method may include transmitting, to a second wireless device, a measurement configuration to support full duplex operation using a shared resource and communicating with the second wireless device based on the measurement configuration.

An apparatus for wireless communications by a first wireless device is described. The apparatus may include a processor, memory coupled with the processor, and instructions stored in the memory. The instructions may be executable by the processor to cause the apparatus to transmit, to a second wireless device, a measurement configuration to support full duplex operation using a shared resource and communicate with the second wireless device based on the measurement configuration.

Another apparatus for wireless communications by a first wireless device is described. The apparatus may include means for transmitting, to a second wireless device, a measurement configuration to support full duplex operation using a shared resource and means for communicating with the second wireless device based on the measurement configuration.

A non-transitory computer-readable medium storing code for wireless communications by a first wireless device is described. The code may include instructions executable by a processor to transmit, to a second wireless device, a measurement configuration to support full duplex operation using a shared resource and communicate with the second wireless device based on the measurement configuration.

Some examples of the method, apparatuses, and non-transitory computer-readable medium described herein may further include operations, features, means, or instructions for receiving a measurement report from the second wireless device based on the measurement configuration.

In some examples of the method, apparatuses, and non-transitory computer-readable medium described herein, the communicating may include operations, features, means, or instructions for transmitting a duplexing configuration configuring the full duplex operation of the second wireless device based on the measurement report.

In some examples of the method, apparatuses, and non-transitory computer-readable medium described herein, transmitting the duplexing configuration may include operations, features, means, or instructions for transmitting the duplexing configuration indicating at least one condition, at least one configuration, or both, in which the second wireless device may be to support the full duplex operation.

In some examples of the method, apparatuses, and non-transitory computer-readable medium described herein, transmitting the duplexing configuration may include operations, features, means, or instructions for transmitting the duplexing configuration indicating at least one transmission-receive beam pair on which the second wireless device may be to support the full duplex operation.

In some examples of the method, apparatuses, and non-transitory computer-readable medium described herein, transmitting the duplexing configuration may include operations, features, means, or instructions for transmitting the duplexing configuration indicating at least one condition, at least one configuration, or both, on which the second wireless device may be to support the full duplex operation using the at least one transmission-receive beam pair.

In some examples of the method, apparatuses, and non-transitory computer-readable medium described herein, transmitting the duplexing configuration may include operations, features, means, or instructions for transmitting the duplexing configuration indicating at least one transmission-receive beam pair on which the second wireless device may be not to support the full duplex operation.

In some examples of the method, apparatuses, and non-transitory computer-readable medium described herein, receiving the measurement report may include operations, features, means, or instructions for receiving the measurement report that may be a periodic measurement report, a semi-static measurement report, a dynamically-generated measurement report, an event triggered measurement report, or any combination thereof.

In some examples of the method, apparatuses, and non-transitory computer-readable medium described herein, receiving the measurement report may include operations, features, means, or instructions for receiving the measurement report that indicates at least one measurement value.

In some examples of the method, apparatuses, and non-transitory computer-readable medium described herein, the at least one measurement value may be a received signal strength indicator value, a reference signal receive power value, a signal to interference plus noise value, a channel quality indicator value, a clutter echo delay value, or any combination thereof.

In some examples of the method, apparatuses, and non-transitory computer-readable medium described herein, receiving the measurement report may include operations, features, means, or instructions for receiving the measurement report indicating a cross link interference measurement.

In some examples of the method, apparatuses, and non-transitory computer-readable medium described herein, receiving the measurement report may include operations, features, means, or instructions for receiving the measurement report indicating a reference signal measurement.

In some examples of the method, apparatuses, and non-transitory computer-readable medium described herein, the reference signal measurement may be a channel state information reference signal measurement.

Some examples of the method, apparatuses, and non-transitory computer-readable medium described herein may further include operations, features, means, or instructions for receiving a configuration request from the second wireless device, where the measurement configuration may be based on the configuration request.

In some examples of the method, apparatuses, and non-transitory computer-readable medium described herein, receiving the configuration request may include operations, features, means, or instructions for receiving the configuration request indicating a resource request, a number of beams, or both.

In some examples of the method, apparatuses, and non-transitory computer-readable medium described herein, transmitting the measurement configuration may include operations, features, means, or instructions for transmitting the measurement configuration that indicates a periodic resource set that indicates the shared resource as a periodic shared resource.

In some examples of the method, apparatuses, and non-transitory computer-readable medium described herein, transmitting the measurement configuration may include operations, features, means, or instructions for transmitting the measurement configuration indicating a self-measurement gap in which the second wireless device may be scheduled to monitor a signal within the self-measurement gap.

In some examples of the method, apparatuses, and non-transitory computer-readable medium described herein, transmitting the measurement configuration may include operations, features, means, or instructions for transmitting the measurement configuration indicating the self-measurement gap that may be a periodic self-measurement gap, a semi-static self-measurement gap, a dynamic self-measurement gap, an event-triggered self-measurement gap, or any combination thereof.

In some examples of the method, apparatuses, and non-transitory computer-readable medium described herein, transmitting the measurement configuration may include operations, features, means, or instructions for transmitting the measurement configuration indicating a frequency division multiplexing configuration, a code division multiplexing configuration, or both, for the shared resource.

Some examples of the method, apparatuses, and non-transitory computer-readable medium described herein may further include operations, features, means, or instructions for receiving a measurement report indicating a downlink reference signal measurement, a reference signal measurement, or both, based on the frequency division multiplexing configuration, the code division multiplexing configuration, or both, for the shared resource.

In some examples of the method, apparatuses, and non-transitory computer-readable medium described herein, the first wireless device may be one of a base station or a parent IAB node and the second wireless device may be one of a user equipment or a child IAB node.

Some examples of the method, apparatuses, and non-transitory computer-readable medium described herein may further include operations, features, means, or instructions for transmitting, from the base station, control signaling allocating a resource for uplink transmission, downlink transmission, or both, based on the measurement report and communicating the uplink transmission, downlink transmission, or both, within the resource based on the control signaling.

In some examples of the method, apparatuses, and non-transitory computer-readable medium described herein, the first wireless device may be a central unit and the second wireless device may be an IAB node.

Some examples of the method, apparatuses, and non-transitory computer-readable medium described herein may further include operations, features, means, or instructions for receiving, from the central unit, control signaling allocating a resource for scheduling by the IAB node based on the measurement report and scheduling uplink transmission, downlink transmission, or both, within the resource.

DETAILED DESCRIPTION

Figure 1:
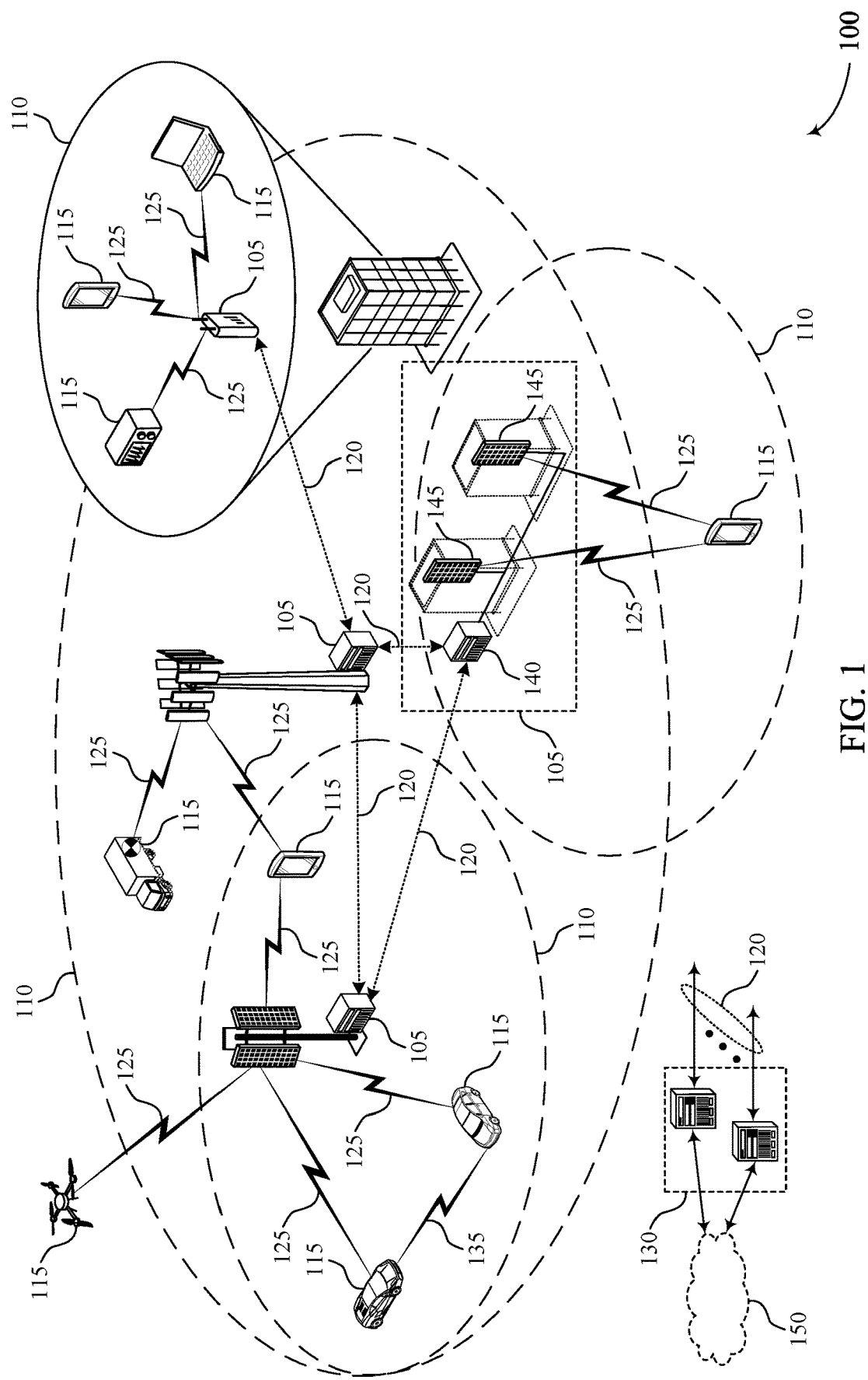
FIG. 1 illustrates an example of a system for wireless communications that supports network-assisted self-measurements to enable full duplex operation in accordance with aspects of the present disclosure.

Some wireless communications system may support full-duplex communications. Full-duplex communications may include simultaneous transmission and reception by a user equipment (UE) or another wireless device. Some systems may support full-duplex communications on the same sector and using the same time and frequency resources. In some cases, a base station or an integrated access and backhaul (IAB) node may include multiple sectors, or cells. Different sectors or cells may often use different architectures, such as having different antenna panels, radio-frequency (RF)/intermediate frequency (IF) components, baseband processing units, or the like.

Self-interference (SI) may exist in a wireless communications system supporting full-duplex operation. SI may occur when a transmitted signal leaks or interferes with a receiver port. SI may also occur when a transmitted signal is reflected back to a receiver port, such as reflected off of an object. SI caused by such reflection off of an object may be an example of clutter echo. A wireless device or a base station may experience SI in many cases of beamforming communications. For example, SI may occur in cases where transmissions by a transmit beam interfere with reception by a receive beam.

SI may be reduced by spatial isolation of transmit and receive beams in a beamforming communications system. In some examples, spatial isolation may be used to reduce clutter echo. Spatial isolation may include selecting beams for transmission and reception that have a lower likelihood of causing SI. SI may also be reduced by a utilization of null-forming, which may include side-lobe suppression. SI may also be decreased by performing SI cancelation in the analog or digital domain, or a combination of these techniques.

A wireless device (e.g., a UE, a base station, a transmission/reception point (TRP), etc.) with multiple antenna arrays may use a first antenna array to transmit a signal using a transmission beam in a shared time or frequency resource (or both), and use a second antenna array to generate a measurement of the signal in the shared resource. This measurement may be an example of a self-measurement.

The measurements may be used by the UE to select pairs of transmit and receive beams that may reduce SI at the UE. In some cases, the UE may autonomously generate the measurements and adjust its beams accordingly. In other cases, the UE may coordinate with a network device to determine which transmit and receive beams to use. In this cases, the UE may transmit a measurement report to network device, such as a base station. The base station may then configure the full-duplex operation of the UE based on the measurement report and other information.

Aspects of the disclosure are initially described in the context of wireless communications systems. Aspects of the disclosure are then described in the context of process flow diagrams. Aspects of the disclosure are further illustrated by and described with reference to apparatus diagrams, system diagrams, and flowcharts that relate to network-assisted self-measurements to enable full-duplex operation.

FIG. 1 illustrates an example of a wireless communications system 100 that supports network-assisted self-measurements to enable full-duplex operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless devices, such as UEs 115, may experience SI in wireless communications system 100. For example, a UE 115 may transmit and receive signals in a full-duplex communication configuration. The UE 115 may experience SI due to signals transmitted by the UE 115 interfering with signal reception by the UE 115. To avoid and decrease SI, the UE 115 may perform network assisted self-measurement techniques. The UE 115 may receive a measurement configuration, from a second wireless device such as a base station 105, to support full-duplex operation using a shared resource. The UE 115 may transmit, via the shared resource, a first signal via a first transmission beam using a first antenna array of the first wireless device. The UE 115 device may monitor, in accordance with the measurement configuration, the shared resource using a first receive beam via a second antenna array of the UE 115. The UE 115 may then transmit a measurement report to a second wireless device based on the monitoring. The base station 105 may transmit, to the UE 115, a duplexing configuration configuring the full-duplex operation of the UE 115 based on the measurement report.

Figure 2:
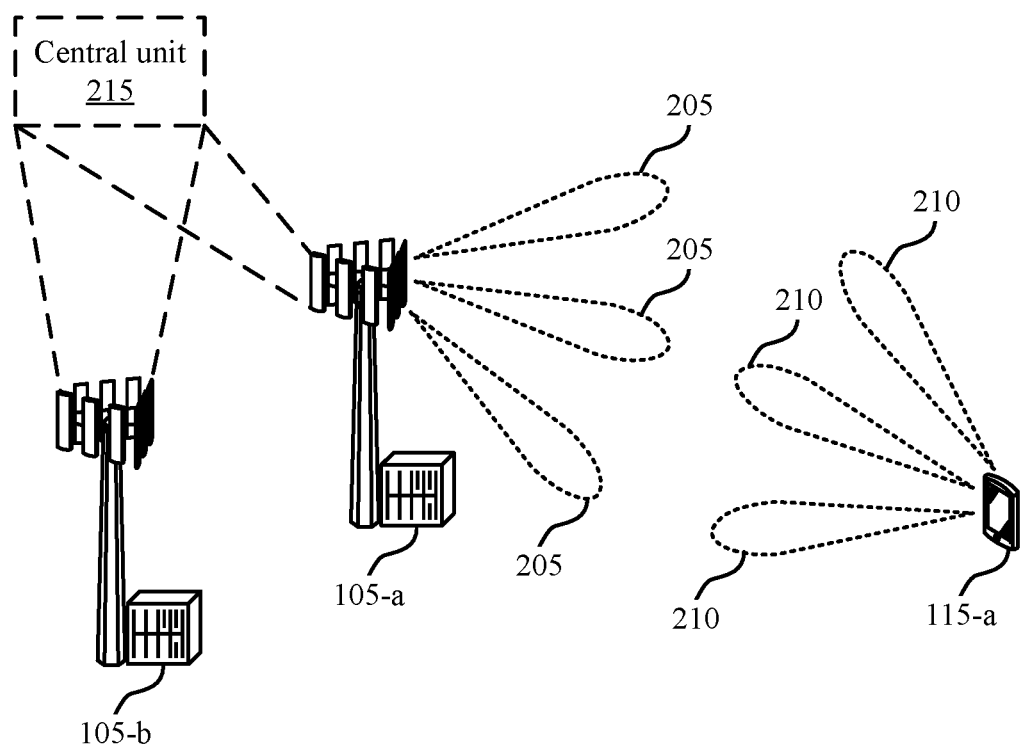
FIG. 2 illustrates an example of a wireless communications system that supports network-assisted self-measurements to enable full duplex operation in accordance with aspects of the present disclosure.

FIG. 2 illustrates an example of a wireless communications system 200 that supports network-assisted self-measurements to enable full-duplex operation in accordance with aspects of the present disclosure. In some examples, wireless communications system 200 may implement aspects of wireless communication system 100. Wireless communications system 200 may support full-duplex communications on the same sector. For example, base station 105-a may include multiple sectors or cells, or the multiple sectors or cells may be implemented on two of more base stations. In some examples, different sectors of base station 105-a may not share the same architecture. Differing architecture may include different antenna panels for each sector, different components for each sector, and different baseband processing units for each sector, or the like.

In some cases, base stations 105-a and 105-b may be a part of an IAB node. This may include base stations 105 being connected to a central unit 215. UE 115-a may be an example of a UE 115, or may also be another wireless device, such as a repeater, a base station a wireless TRP, or another device capable of transmitting from a first set of antennas and receiving from a second set of antennas. UE 115-a may communicate using transmit and receive beams 210 and base station 105-a may communicate using transmit and receive beams 205 as part of a beam-forming communications system.

UE 115-a may experience SI based on a signal transmitted by a beam 210 leaking into a receive port or antenna of UE 115-a. SI may also be caused by a signal transmitted by UE 115-a being reflected back into the receive port. This may be an example of clutter echo. UE 115-a may perform self-measurements to measure SI. The self-measurements may aid UE 115-a in determining whether UE 115-a has the capability to perform full-duplex communications. For example, if the SI is too high for all beams 210, UE 115-a may determine that it cannot perform full-duplex communications, and may resort to half-duplex communications.

Self-measurements may include transmitted a signal from a first set of antennas, on one or more transmit beams, and measuring the received signal on the second set of antennas. UE 115-a may measure the received signal using one or more receive beams 210, including multiple beam directions. The transmitted signal may leak into the receive antenna port during transmission, or may be reflected back to the antenna port by an object or reflector. The object or reflector may cause a clutter echo. In some cases, the transmitting antenna array and the receiving antenna array may be the same antenna array or may be different.

In some cases, a wireless device may perform self-measurements transparently. In this case, there may be limited signaling or coordination of the self-measurement with other network entities. For example, when base station 105-a (or a data unit (DU)) transmits a downlink signal on one or more beams 205, base station 105-a can measure the SI at the receive port of base station 105-a. The received signal may be measured in terms of a power measurement, such as reference signal received power (RSRP), in order to determine SI. In another example, UE 115-a (e.g., a mobile terminal (MT)) may transmit an uplink signal on a beam 210. UE 115-a may measure the received signal at a receive port of UE 115-a without coordinating this self-measurement with other network entities (e.g., base station 105-a).

In some cases, the wireless device performing the self-measurement may not provide a report of the results of the self-measurement. In some cases, the wireless device may use the self-measurement for determining whether the wireless device can support full-duplex communications. The wireless device may also determine independently whether it may perform beam-tuning to decrease SI.

The network may provide configurations that indicate resources for the wireless device to perform self-measurement. The network may configure the device to provide reports of the self-measurements performed by the device. Further, based on receive self-measurement reports, the network may determine the wireless device full-duplex capability of the wireless device (e.g., rather than the full-duplex capability being determined by the wireless device itself). In some cases, the wireless device may be a scheduled node of the network, which may mean that the wireless device does not have the opportunities or resources to perform the self-measurements. In this case, the network may provide configurations or resources, or both, so that the wireless device (e.g., UE 115-a) may perform self-measurements. In some cases, UE 115-a may not have the capability to perform self-measurements or determine configurations autonomously. In this case, the network may instead provide configurations and signaling for UE 115-a or base station 105-a to perform self-measurements.

Further, network assisted self-measurements may also give more control and flexibility to the network to determine the operation mode and schedule of wireless devices served by the network.

UE 115-a (e.g., a MT) may be configured with a measurement configuration indicting to transmit one or multiple uplink signals (e.g., a sounding reference signal (SRS)) via one or more beams 210. This configured uplink signal may be used for self-measurements. In some cases, the network may configure the UE 115-a in a measurement configuration with a periodic SRS resource set for on-going self-measurement by UE 115-a. The usage, by UE 115-a, of the configured SRS resource set may be identified as self-measurements. The same SRS transmissions may also be used for measurements by another node, such as base station 105-a (e.g., a parent node), or cross-link interference (CLI) measurements by other UEs 115 (e.g., other MTs). The selection of which beam 210 to use for SRS transmission may be indicated to UE 115-a by the network. For example, the beam 210 may be indicated in a spatial relation parameter (e.g., spatialRelationInfo) by the network. In some examples, the UE 115-a may select the beam 210 for transmission to use for SI measurement. For example, UE 115-a may determine to select the beam 210 for transmission based on not receiving an indication or a parameter indicating a beam from the network.

In one example, the beam 210 directions may be selected based on the potential active or candidate beams 210 used for uplink communications by UE 115-a to a parent node (e.g., base station 105-a). The active or candidate beams 210 may correspond to an active link or a link scheduled to become active within a time period. In another example, the beam 210 directions may by selected based on the location of the detected reflectors and in order to train beams 210 (e.g., both transmit and receive beams) towards or away from the detected reflectors.

Further, transmission power may be determined autonomously by UE 115-a or based on a configuration received from the network. The transmission power for the signals use for SI measurement may be dynamically selected or configured, such that the transmission power for signals used for SI measurement may be different than the transmission power for other transmissions by UE 115-a or another wireless device (e.g., different from other signals sent on the uplink). For example, a larger power (e.g., up to a maximum available transmission power of UE 115-a), compared to power for other signaling, may be used by UE 115-a for the SI measurement transmission. This larger power may enable UE 115-a to determine a more accurate measurement of SI, such as caused by clutter echo from a reflector or other object. A smaller power may also be selected for the signal used for SI measurement. The smaller power may be used to enable a local SI measurement, while simultaneously reducing interference on other active links. Thus, SI measurement may be performed with a lower power so as to not interfere with other communications occurring at UE 115-a.

In some cases, UE 115-a may request for the network to provide resources or configurations for SI measurements. UE 115-a may transmit this request to the network using a beam 210. The request may include an indication of beams 210, or resources, or both, that are available at UE 115-a for SI measurement. The methods for SI measurement are described in reference to FIG. 3.

In response, the base station 105-a (e.g., or other network entity) may indicate a self-measurement gap (e.g., time period in which to perform a self-measurement) as part of a measurement configuration indicated to UE 115-a. The self-measurement gap indicated by base station 105-a may be a set of future resources described in the measurement configuration for UE 115-a to use to perform SI measurement. The measurement configuration may indicate a future time and/or frequency resource for the self-measurement gap. For example, the measurement configuration may indicate when the measurement gap may occur, on which one or more frequency resources the gap occurs, on which one or more slots the gap occurs, one or more beam directions to utilize for the SI measurement, one or more antennas to utilize for the SI measurement, other resource parameters, and any combination thereof.

During the configured self-measurement gap indicated in the measurement configuration from base station 105-a, UE 115-a may not be scheduled by the base station 105-a to receive any other downlink signaling on the resources of the self-measurement gap. Thus, UE 115-a may perform self-measurement during the configured self-measurement gap without interfering with or missing other transmissions. In the request transmitted by UE 115-a, in some cases UE 115-a may specifically indicate a request for a measurement gap. The self-measurement gap (e.g., a measurement window) may be configured to be periodic, semi-persistent, or dynamic (e.g., a resource indicated in downlink control information (DCI)). UE 115-a may also receive a configuration to receive and measure a set of one or more downlink signals (e.g., reference signals, synchronization signals, data transmissions, control transmission, etc.) from base station 105-a (e.g., the parent node) or measure a set of SRSs from at least one other UE 115. The configuration to measure these other signals may, in some cases, apply to the same resources as the measurement gap. For example, FDM or CDM techniques, or both may be used to orthogonalize the other signals relative to the signal being measured.

Further, the base station 105-a may also provide self-measurement configurations to UE 115-a. For example, the self-measurement configurations may include which resources to use for self-measurement (e.g., aligned at least in part with a scheduled uplink transmission), which receive beams to use for self-measurement, or the like. The network may also configure UE 115-a with a self-measurement report configuration. The report may be periodic, semi-static, dynamic, or event-triggered. UE 115-*a* may report which transmit and receive beam pairs may and may not be used for full-duplex communication based on the SI measurements. UE 115-*a* may also report the associated SI measurement values in the measurement report, and the base station 105-*a* may select which transmit and receive beam pairs may and may not be used for full-duplex communication. The SI measurement values may include one or more of received signal strength indicator (RSSI), reference signal received power (RSRP), signal to interference noise ratio (SINR), channel quality indicator (CQI), measured delay for one or more clutter echoes, or other signal measurements.

Base station 105-*a* may communicate with UE 115-*a* based on the measurement configuration, including the self-measurement configuration. Base station 105-*a* may configure transmission of downlink signals (e.g., PDCCH transmission, PDSCH transmissions) based on the configuration. For example, the base station 105-*a* may determine one or more SI values, including one or more of a RSSI, RSRP, SINR, and CQI, in accordance with the measurement configuration, and may set one or more transmission parameters based on the one or more SI values. For example, the base station 105-*a* may use an SI value to set one or more transmission parameters including a transmission power level, a coding rate, a multiplexing scheme, an MCS value, or the like, or any combination thereof, based on one or more SI values determined using the measurement configuration. UE 115-*a* may similar communicate with base station 105-*a* based on the monitoring that UE 115-*a* performs in accordance with the measurement configuration. For example, UE 115-*a* may determines one or more SI measurement values, including one or more of a RSSI, RSRP, SINR, and CQI, in accordance with the measurement configuration. UE 115-*a* may configure transmission of one or more uplink signals (e.g., PUCCH transmission, PUSCH transmission) to base station 105-*a* based on the measurements. For example, the UE 115-*a* may determine one or more SI values, including one or more of a RSSI, RSRP, SINR, and CQI, in accordance with the measurement configuration, and may set one or more transmission parameters based on the one or more SI values. For example, the UE 115-*a* may use an SI value to set one or more transmission parameters including a transmission power level, a coding rate, a multiplexing scheme, an MCS value, or the like, or any combination thereof, based on one or more SI values determined using the measurement configuration.

In some cases, UE 115-*a* may report the results of the SI measurement using a CLI measurement procedure, which may include a CLI report. The CLI report may indicate a SRS-RSRP measurement, or a CLI-RSSI measurement, or both. The SRS-RSRP resources, or CLI-RSSI resources, or both, may be used for indicating the SI measurement. Either of these measurements may be indications of a measurement of SI.

In other cases, UE 115-*a* may report CQI as a SI measurement. UE 115-*a* may report CQI by configuring CSI-IM or zero-power or non-zero power CSI-RS resources on the same set of resources. These resources may be configured as the resources used for transmitting an indication of the SI measurement.

UE 115-*a* may reduce SI, and SI caused by clutter echo, by utilizing spatial isolation. Spatial isolation may include selecting transmit and receive beams 210 such that SI may be avoided or reduced. UE 115-*a* may also reduce SI using null-forming. UE 115-*a* may also perform SI cancelation internally in the analog and digital domain.

Base stations 105 may similarly experience SI due to leaking transmitting signals of clutter echo. Base stations 105 may decrease SI by also performing spatial isolation, null-forming, and SI cancelation using the methods described herein with respect to a UE 115 or wireless device. Base station 105 may also select which beams 205 to use based on SI measurements.

The network operated measurement configuration as described herein may apply to a base station 105 and a UE 115, but may also apply to communications between central unit 215 and base stations 105-*a* and 105-*b*.

Figure 3:
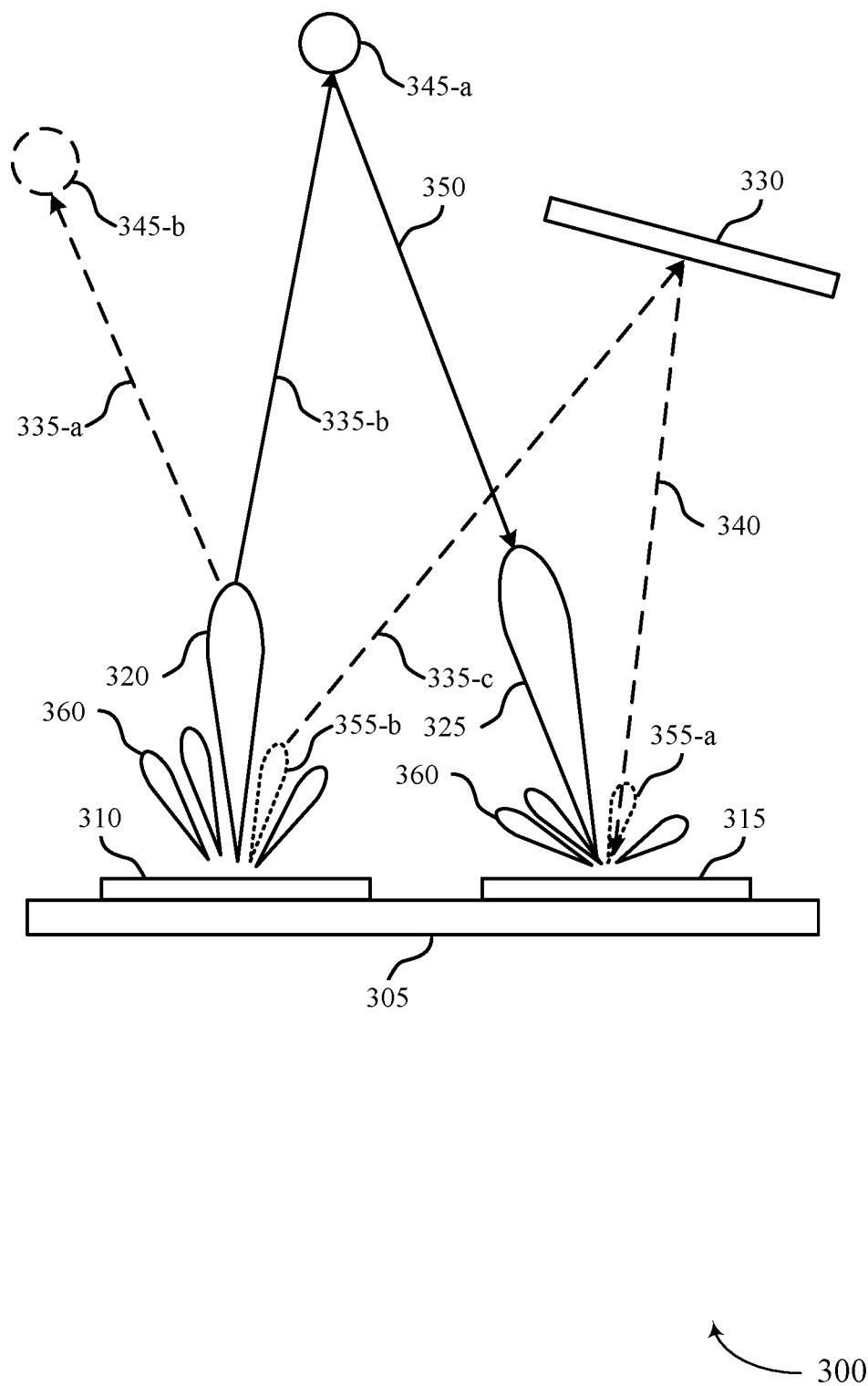
FIG. 3 illustrates an example of an antenna diagram that supports network-assisted self-measurements to enable full duplex operation in accordance with aspects of the present disclosure.

FIG. 3 illustrates an example of an antenna diagram 300 that supports network-assisted self-measurements to enable full-duplex operation in accordance with aspects of the present disclosure. In some examples, antenna diagram 300 may implement aspects of wireless communication systems 100 and 200. Node 305 may be a component of a wireless device the performs SI measurement. For example, node 305 may be a component of a UE 115, a base station 105, or an IAB node (e.g., a parent IAB node or a child IAB node) as described with reference to FIGS. 1 and 2. Node 305 may include antenna arrays 310 and 315. Antenna array 310 may be an example a transmit antenna array. Antenna array 315 may be an example of a receive antenna array. The wireless device corresponding to node 305 may use transmit antenna array 310 and corresponding transmit beam 320 to transmit signal 335. In this example, antenna diagram 300 illustrates one transmit beam 320 having a main lobe and corresponding side lobes 360 of the transmit beam 320. The depicted size of the lobes of transmit beam 320 may represent the amount of transmit gain in a particular direction during transmission of signal 335. Signals 335 may be reference signals transmitted for the purpose of SI measurement by the node, or may be other signals, such as signals for communication with node 345. Node 345 may be an example of another wireless device, such as a UE 115, a base station 105, an IAB node (e.g., a parent IAB node or a child IAB node), or a central unit. SI at the node 305 may be caused by reflectors 330 or other SI.

Node 305 may select beams 320 and signals 335 to transmit in order to measure SI caused by reflectors 330, clutter echo, and other leakage interference, in accordance with the measurement configuration. Transmit array 310 may transmit signals 335 that may be received as reflected signals 340 at receive array 315. Receive beam 325 may receive other signals 350 from other wireless devices (e.g., node 345-*a*). In this example, antenna diagram 300 illustrates one receive beam 325 and corresponding lobes 360. Transmit beam 320 may be an example of a beam 210 as described with reference to FIG. 2. Receive beam 325 may be an example of a beam 210 as described with reference to FIG. 2.

In order to measure SI, node 305 may transmit one or more signals 335 from transmit antenna array 310 using one or more transmit beams 320. Node 305 may then measure the received signal on the second antenna array 315 using one or more receive beams 325. Any type of signal 335 may be transmitted by the one or more transmit beams 320. Transmit beams 320 may also transmit a reference signal as signal 335, such as a reference signal specific to SI measurement, or another reference signal in use for other uplink or downlink transmissions by the node. The signal 335 transmitted for SI measurement may also be a part of other communications of which the node 305 is a part. For example, the node 305 may be in communication with one or more other nodes 345. The node 305 may therefore use a signal 335 transmitted to another node as the signal 335 for SI measurement. The transmission to the another node may be associated with some cell-specific signals that may be broadcast over the air, and may therefore not be intended for a particular receiver. For example, the signal 335 transmitted for SI measurement may be a synchronization signal block (SSB) type of signal.

In another case, the transmitted signal 335 for SI measurement may be a signal that is sent for the purpose of generating SI measurements by the node 305. In this case, there may be a flexibility to choose the transmit configuration for SI measurement. For example, parameters of the transmit configuration of signal 335 transmission may include power, beam direction, and other parameters. The parameters may be selected for transmission of the signal 335 for SI measurement. The flexibility of selecting the parameters may increase the amount of resources used for SI transmission.

One or more beams 320 may transmit signals 335 for SI measurement. For example, a beam 320 may transmit signal 335-c, which may be reflected as signal 340 from a reflector 330. Reflector 330 may be an example of a cause of clutter echo.

The receive antenna array 315 and receive beams 325 may then measure SI by measuring a received power measurement, such as total received power, of the received signal 340. The received power measurement may be used to determine the SI occurring based on the transmitted signal 335 (e.g., signal 335-c). In an example, the received power measurement may be a measure of received signal strength (e.g., received signal strength indicator (RSSI)). To measure received power, the receive antenna array 315 may not need to be aware of what type of signal was transmitted by transmit antenna array 310. In order to determine the total power, the receive antenna array 315 may be aware of what resources over which the signal 335-c was transmitted. This measurement configuration may be applicable in cases where any type of signal may be used by the transmit antenna array 310.

The receive antenna array 315 may also measure SI as a measurement of reference signal received power (RSRP) of the received signal 340. To measure RSRP, the receive antenna array 315 may measure the received power of the received signal 340, and may be aware of what type of signal 335-c was transmitted. This measurement configuration may be applicable in cases where the transmit antenna array 310 transmits a reference signal (e.g., either a general reference signal or a SI measurement specific reference signal). Other types of SI measurements include a signal to noise ratio (SNR), a signal to interference plus noise ratio (SINR), a channel quality indicator (CQI) measurement, a measured delay value for a clutter echo, or the like.

In some cases, the transmit beam 320 selected for signal transmission may be fixed. For example, the transmit beam 320 may be transmitted in a particular direction with known properties (e.g., power level, beam width, etc.). The first transmit beam 320 may be selected and use to transmit signal 335-a. Signal 335-c may be reflected by reflector 330 as reflected signal 340. In these cases, multiple receive beams 325 may be used to measure the received signal 340. For example, the UE 115 may sweep one or more receive beams 325 over a set of different directions in one or more time periods to measure the reflected signal 340.

In another case, a first transmit beam 320 may be selected, and each receive beam 325 may be selected at a time to receive and measure a power measurement to determine the SI of the reflected signal. Then, the transmit beam 320 may be changed to another transmit beam pointed in another direction, or with different parameters (not shown), and another signal may be transmitted and each receive beam 325 may be swept through again. Receive array 315 may sweep through each receive beam 325 to receive and measure reflected signal 340. The transmit beam 320 may be continually changed until each transmit beam has transmitted a signal 335, that has also been received by each receive beam 325. Thus, measurements of SI may be determined for each transmit beam 320 and each receive beam 325 combination.

The node 305 may generate a measurement report that includes one or more SI measurements for one or more beams or beam pairs, and the network, e.g., a base station, may use the measurement report to configure the node 305 with a duplexing configuration to configure which one or more beams or beam pairs the node 305 is to use, as well as to control whether the node 305 is scheduled to operate in a full-duplex mode for a resource. The duplexing configuration may also configure node 305 to use null-forming to decrease or avoid SI. In null-forming, the receive array 315 may aim a main lobe (e.g., with the highest receive gain) of a receive beam 325, in the direction of node 345-a, in order to receive signals 350 from node 345-a. The main lobe of beam 325 may be selected such that it has the highest receive gain. Receive array 315 may also place a null 355-a in the direction of the clutter echo from reflector 330. This null 355-a placement may reduce the clutter echo 340 cause by a reflection of a signal 335 transmitted by transmit array 310.

The sector transmitter beam 320 may also place a null 355-b in a direction of a clutter reflector 330 to reduce the amount of transmit gain of signal 335-b transmitted in the direction of the reflector 330. Null 355 may be a point between lobes 360. The null placement may be selected based on the organization of the clutter, and the number of clutter reflectors 330 or amount of clutter echo.

Figure 4:
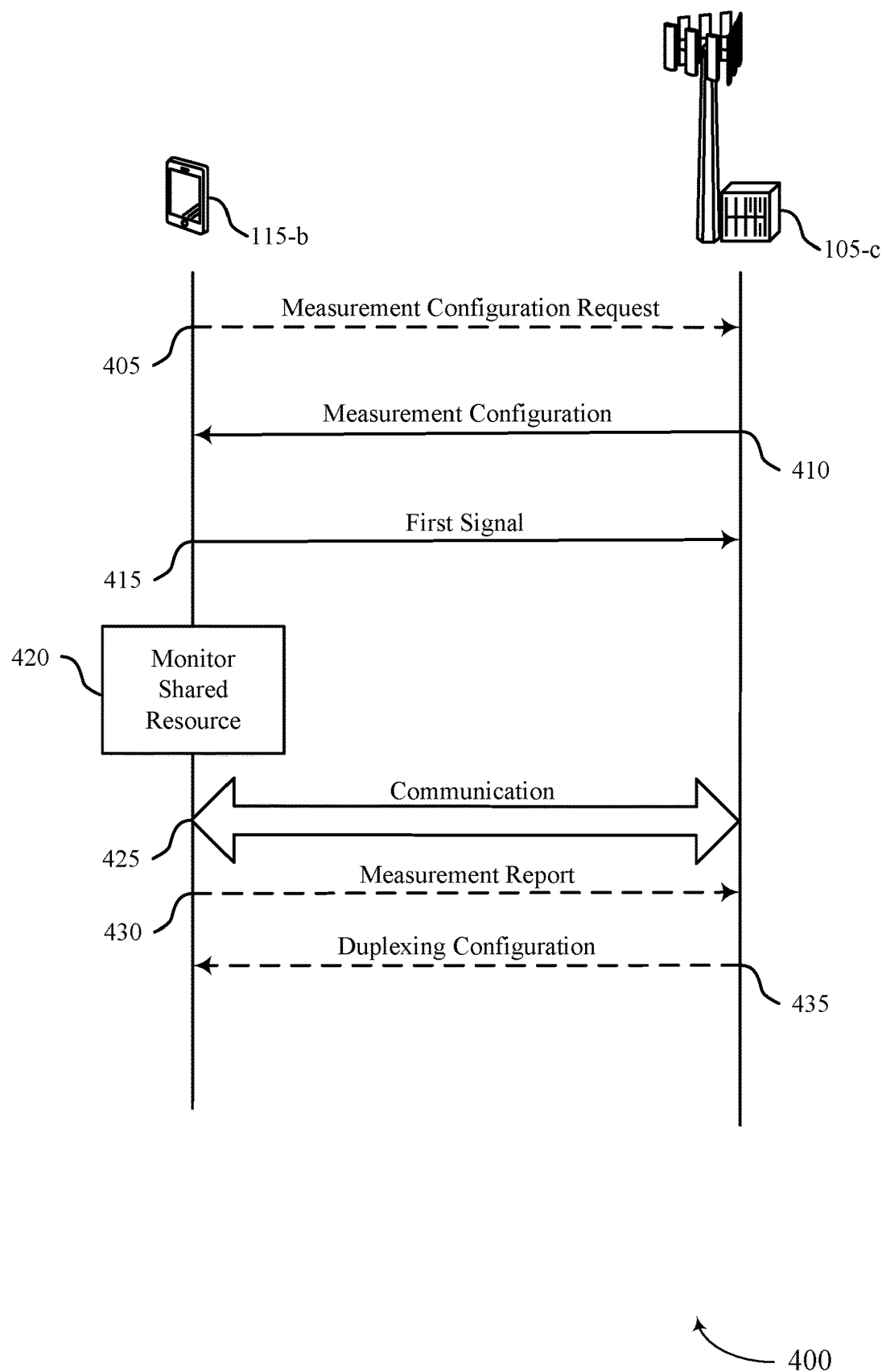
FIG. 4 illustrates an example of a process flow that supports network-assisted self-measurements to enable full duplex operation in accordance with aspects of the present disclosure.

FIG. 4 illustrates an example of a process flow 400 that supports network-assisted self-measurements to enable full duplex operation in accordance with aspects of the present disclosure. In some examples, process flow 400 may implement aspects of wireless communication system 100. Process flow 400 may include UE 115-b, which may be an example of UE 115-a as described with reference to FIGS. 1 and 2. UE 115-b may be an example of a child IAB node, a MT, a parent IAB node or another wireless device. Process flow 400 may also include base station 105-c, which may be an example of base stations 105 as described with reference to FIGS. 1 and 2. Base station 105-c may be an example of a parent IAB node or a central unit.

At 405, UE 115-b may transmit a configuration request to base station 105-c. The measurement configuration received at 410 may be based on the configuration request. The configuration request may indicate a resource request, a number of beams, or both.

At 410, UE 115-b may receive a measurement configuration to support full-duplex operation using a shared resource. The measurement configuration may configure the UE 115-b to perform the operations described herein. For example, the measurement configuration may indicate a periodic resource set that may indicate the shared resource as a periodic shared resource in which the UE 115-b is to perform SI measurement. The measurement configuration may also indicate a self-measurement gap in which UE 115-b may be scheduled to monitor a signal within the self-measurement gap perform SI measurement. The measurement gap may be a periodic self-measurement gap, a semi-static self-measurement gap, a dynamic self-measurement gap, an event-triggered self-measurement gap, or any combination of these. The measurement configuration may also indicate a FDM configuration, a code-division multiplexing (CDM) configuration, or both, for the shared resource. The measurement configuration may also configure the UE 115-b with which one or more antenna arrays to use for transmission of a signal via one or more transmit beams, and one or more antenna arrays to use for measuring SI using one or more receive beams. For example, the measurement configuration may indicate to transmit a signal in a shared resource via a first transmit beam using a first antenna array, and to measure SI in the shared resource via a first one or more receive beams using a second antenna array (e.g., sweep over a set of receive beams).

At 415, UE 115-b may transmit, via the shared resource, a first signal via a first transmission beam using a first antenna array of UE 115-a. The first signal may be a reference signal, a synchronization signal, a control transmission, a data transmission, or a combination of these. UE 115-b may transmit the first signal using a transmission power that may be indicated in the measurement configuration. UE 115-b may also transmit the first signal using the first transmission beam having a beam direction indicated in the measurement configuration. UE 115-b may transmit the first signal using the first transmission beam having a beam direction pointed in the direction of a reflector.

At 420, UE 115-b may monitor, in accordance with the measurement configuration, the shared resource using a first receive beam via a second antenna array of the first device. UE 115-b may monitor, in accordance with the measurement configuration, the shared resource using a set of receive beams via the second antenna array. The set of receive beams may correspond to an active link or a link scheduled to be active within a defined time during.

At 425, UE 115-b may communicate with base station 105-c (e.g., a second wireless device). For example, the communication may include transmitting, at 430 a measurement report to base station 105-b based on the monitoring. In other cases, UE 115-b may communicate, at 425, by using an observed SI measurement value (e.g., an RSRP value) to select one or more of a MCS, coding rate, a transmission power, or any combination therefor, for uplink communications with base station 105-c. In cases where UE 115-b transmits a measurement report at 430, the measurement report may indicate a downlink reference signal measurement, a reference signal measurement, or both, based on the FDM configuration, the CDM configuration, or both, for the shared resource. The measurement report may be a periodic measurement report, a semi-static measurement report, a dynamically-generated measurement report, an event triggered measurement report, or a combination of these. The measurement report may also indicate at least one measurement value, such as a RSRP value, a RSSI value, a SINR value, a CQI value, a clutter echo delay value, or a combination of these. The measurement report may also indicate the cross link interference measurement or the reference signal measurement, or both. The UE 115-b may also generate and include a cross link interference measurement for the shared resource in the measurement report based on the monitoring. UE 115-b may also generate and include a reference signal measurement for the shared resource in the measurement report based on the monitoring. In some examples, the reference signal measurement may be a CSI-RS measurement.

UE 115-b may also receive, from base station 105-c, control signaling allocating a resource for uplink transmission, downlink transmission, or both, based on the measurement report. UE 115-b may communicate the uplink transmission, downlink transmission, or both, within the resource based on the control signaling. In cases where base station 105-c is a central unit and UE 115-c is an IAB node, UE 115-b may receive control signaling allocating a resource for scheduling by the IAB node based on the measurement report. UE 115-b, as the IAB node, may schedule uplink transmission, downlink transmission, or both, within the resource.

In some cases, at 435, UE 115-b may receive a duplexing configuration configuring the full duplex operation of UE 115-b based on the measurement report. Base station 105-c may transmit the duplexing configuration based on the communication at 425, including based on receiving the measurement report at 430. UE 115-b may communicate, via the shared resource, via the first antenna array and the second antenna array based on the duplexing configuration. The duplexing configuration may indicate at least one condition, at least one configuration, or both, in which UE 115-b may support the full-duplex operation. The at least one condition may be one or more of a power level, beam direction, time period, or any combination thereof, in which the base station 105-c determines that the UE 115-b is to support full-duplex operation. The duplexing configuration may also indicate at least one transmission-receive beam pair on which UE 115-b is to support the full-duplex operation. The duplexing configuration may also indicate at least one condition, at least one configuration, or both, on which UE 115-b may support the full-duplex operation using the at least one transmission-receive beam pair. The duplexing configuration may also indicate at least one transmission-receive beam pair on which UE 115-b is not to support the full-duplex operation. The base station 105-c may then schedule the UE 115-b in accordance with the duplexing configuration. In some cases, the duplexing configuration may include scheduling information (e.g., a grant) or the base station 105-c may communicate a separate control signal to schedule the UE 115-b. For example, the base station 105-c may transmit a grant (e.g., in DCI) scheduling the UE 115-b with a shared resource in which to simultaneously transmit and receive using a particular transmit-receive beam pair on which the base station 105-c has determined that the UE 115-b supports full-duplex operation. In another example, the base station 105-c may transmit a grant (e.g., in DCI) scheduling the UE 115-b with a shared resource in which to transmit or receive, but not both, using a particular transmit or receive beam when the base station 105-c determines that the UE 115-b does not full-duplex operation.

Figure 5:
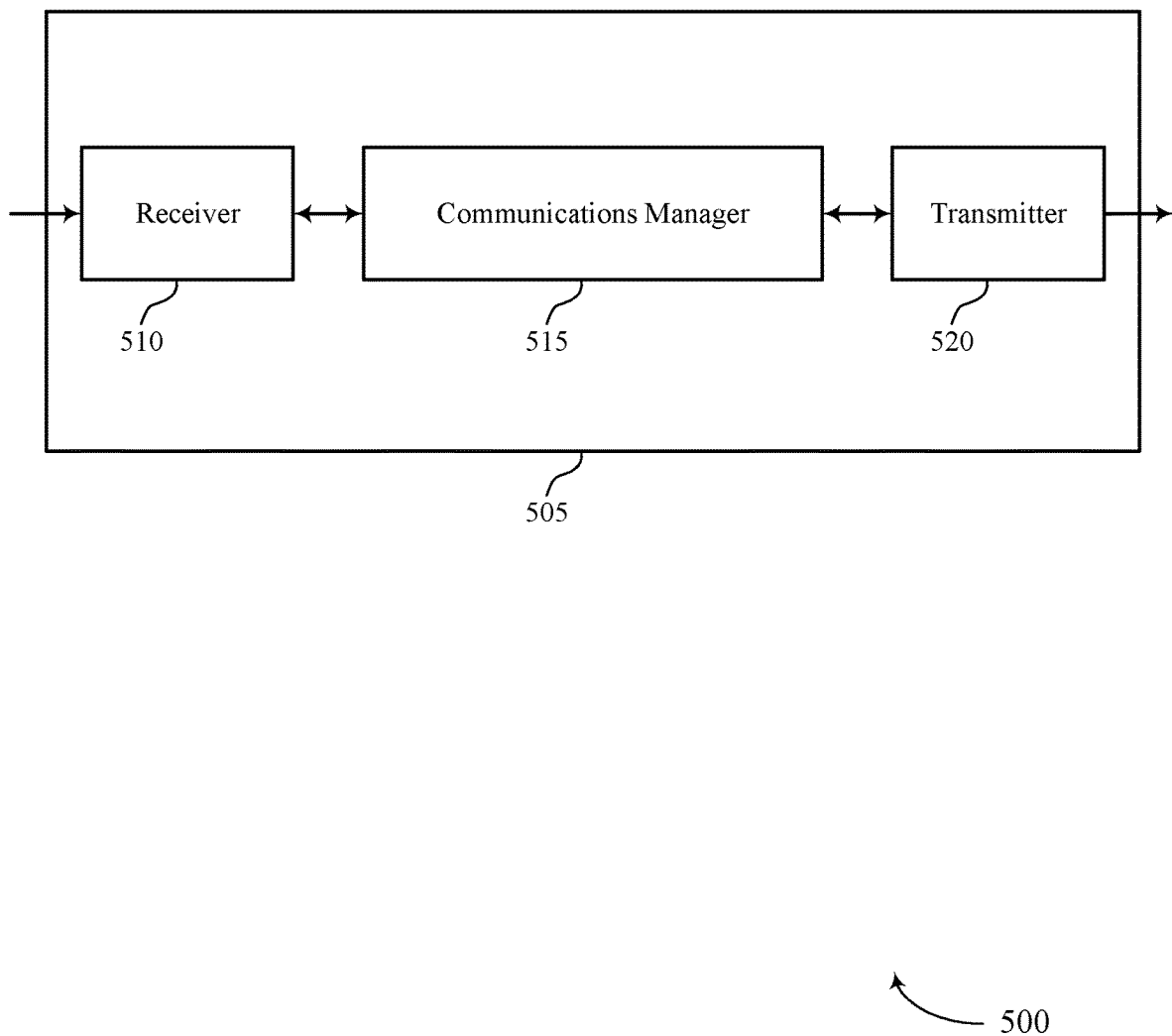
FIGS. 5 and 6 show block diagrams of devices that support network-assisted self-measurements to enable full duplex operation in accordance with aspects of the present disclosure.

FIG. 5 shows a block diagram 500 of a device 505 that supports network-assisted self-measurements to enable full duplex operation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to network-assisted self-measurements to enable full duplex operation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a measurement configuration to support full duplex operation using a shared resource, transmit, via the shared resource, a first signal via a first transmission beam using a first antenna array of the first wireless device, monitor, in accordance with the measurement configuration, the shared resource using a first receive beam via a second antenna array of the first wireless device, and transmit a measurement report to a second wireless device based on the monitoring. The communications manager 515 may be an example of aspects of the communications manager 810 described herein.

In some cases, the communications manager 515 may receive a measurement configuration to support full duplex operation using a shared resource, transmit, via the shared resource, a first signal via a first transmission beam using a first antenna array of the first wireless device, monitor, in accordance with the measurement configuration, the shared resource using a first receive beam via a second antenna array of the first wireless device, and communicate with a second wireless device based on the monitoring. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.). The wireless modem may obtain and decode signals from the receiver 410 over a receive interface, and may output signals for transmission to the transmitter 420 over a transmit interface.

The actions performed by the communications manager as described herein may be implemented to realize one or more potential advantages. One implementation may allow a UE 115 to save power an increase battery life by decreasing interference at the UE 115. Decreasing interference at the UE 115 may improve reliability at the UE 115, which may further decrease the amount of retransmissions to and from the UE 115. This may further decrease latency and delays, and improve overall performance of a UE 115.

Figure 6:
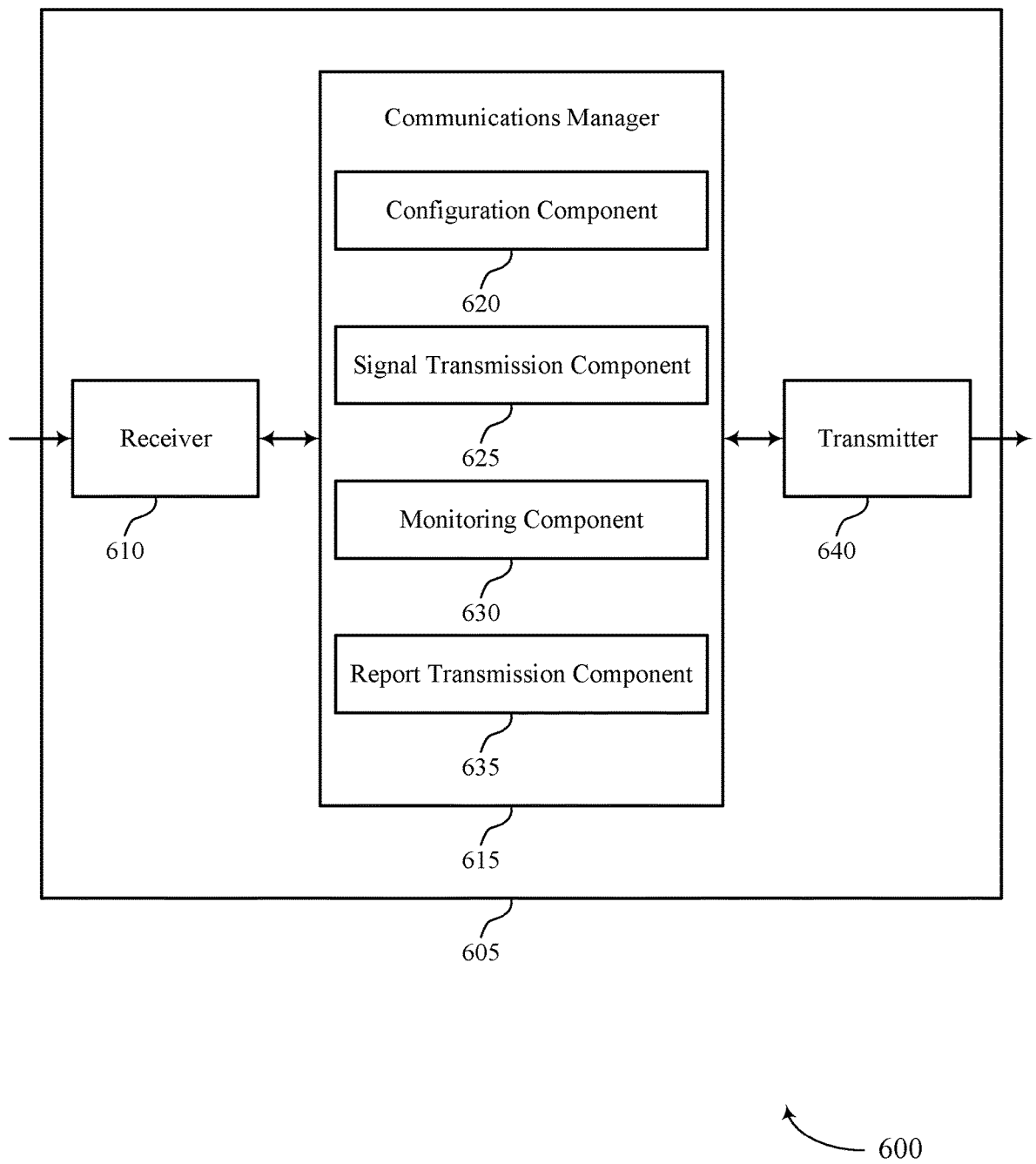

FIG. 6 shows a block diagram 600 of a device 605 that supports network-assisted self-measurements to enable full duplex operation in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to network-assisted self-measurements to enable full duplex operation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration component 620, a signal transmission component 625, a monitoring component 630, and a report transmission component 635. The communications manager 615 may be an example of aspects of the communications manager 810 described herein.

The configuration component 620 may receive a measurement configuration to support full duplex operation using a shared resource.

The signal transmission component 625 may transmit, via the shared resource, a first signal via a first transmission beam using a first antenna array of the first wireless device.

The monitoring component 630 may monitor, in accordance with the measurement configuration, the shared resource using a first receive beam via a second antenna array of the first wireless device.

The report transmission component 635 may transmit a measurement report to a second wireless device based on the monitoring. The report transmission component 635 may also communicate with a second wireless device based on the monitoring.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 8:
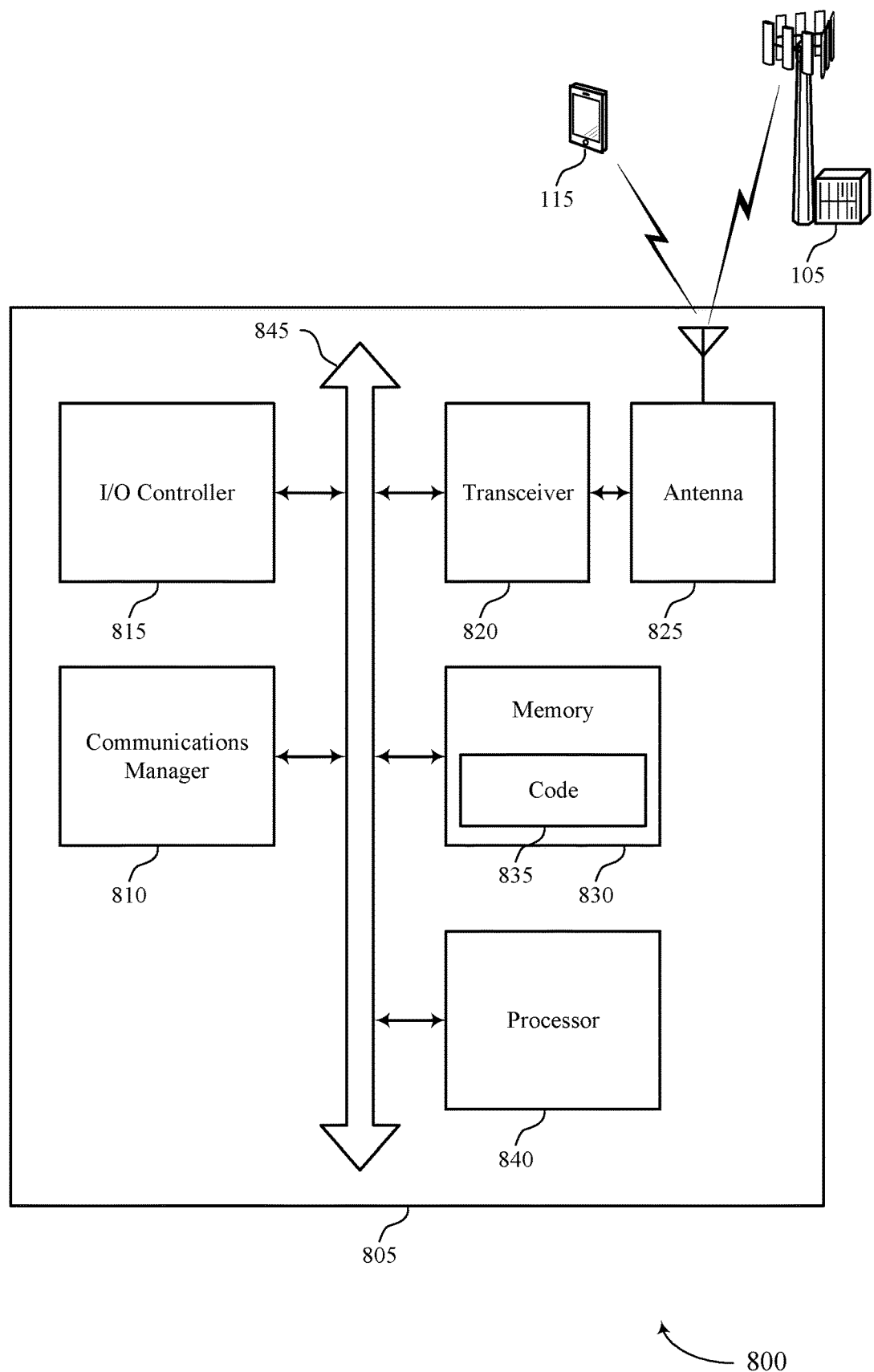
FIG. 8 shows a diagram of a system including a device that supports network-assisted self-measurements to enable full duplex operation in accordance with aspects of the present disclosure.

A processor of a UE 115 (e.g., controlling the receiver 510, the transmitter 520, or the transceiver 820 as described with respect to FIG. 8) may improve efficiency at the UE 115 by operating the components and procedures described herein. For example, the processor of the UE 115 may operate receiver 510 to receive interfering signals, which the processor may then use to determine SI measurements. The processor of the UE 115 may also operate transmitter 540 to transmit an indication of the measured SI. these procedures may improve battery life of the UE 115 by decreasing interference, and decreasing the amount of retransmissions to and from the UE 115.

Figure 7:
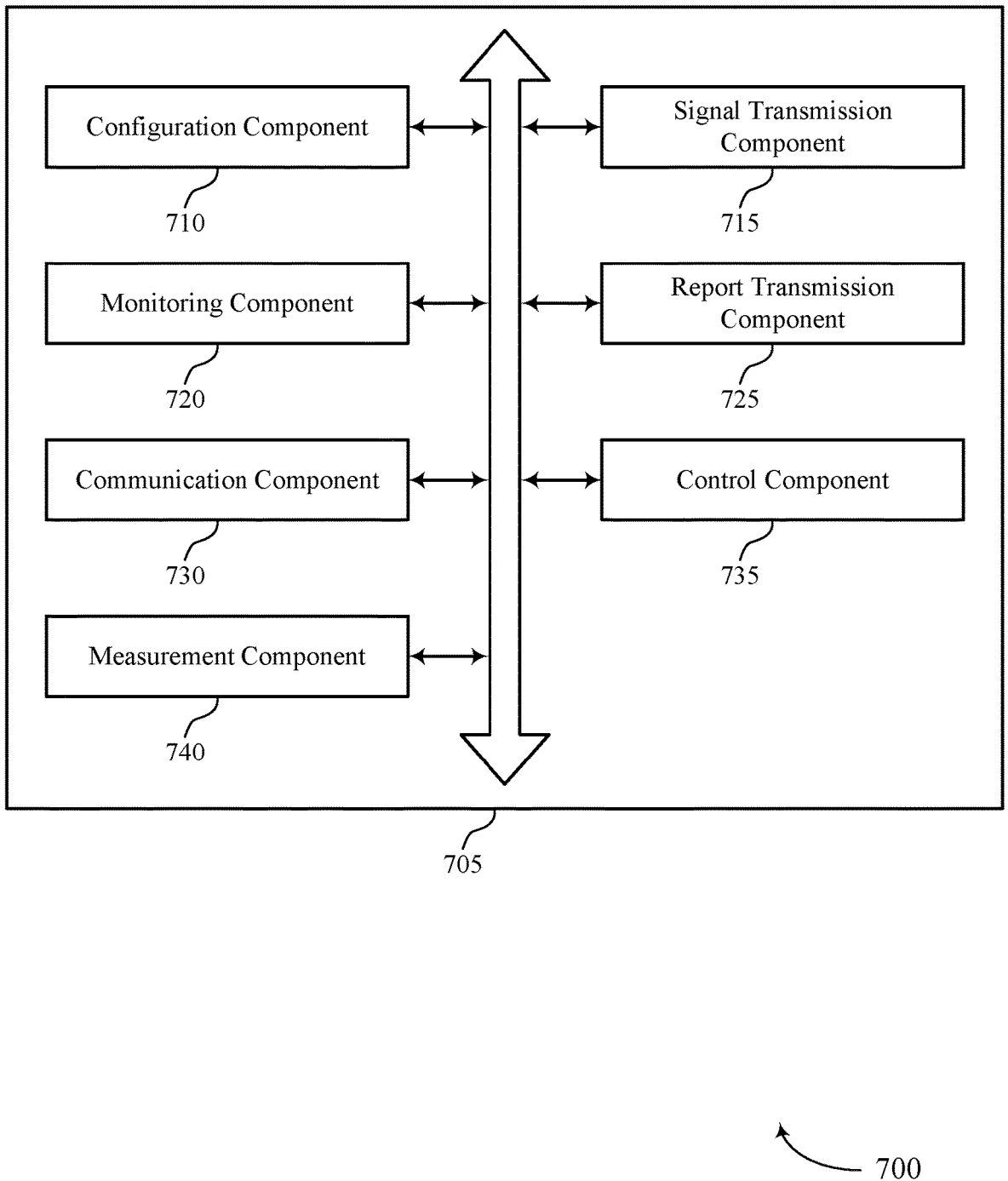
FIG. 7 shows a block diagram of a communications manager that supports network-assisted self-measurements to enable full duplex operation in accordance with aspects of the present disclosure.

FIG. 7 shows a block diagram 700 of a communications manager 705 that supports network-assisted self-measurements to enable full duplex operation in accordance with aspects of the present disclosure. The communications manager 705 may be an example of aspects of a communications manager 515, a communications manager 615, or a communications manager 810 described herein. The communications manager 705 may include a configuration component 710, a signal transmission component 715, a monitoring component 720, a report transmission component 725, a communication component 730, a control component 735, and a measurement component 740. Each of these modules may communicate, directly or indirectly, with one another (e.g., via one or more buses).

The configuration component 710 may receive a measurement configuration to support full duplex operation using a shared resource.

In some examples, the configuration component 710 may receive a duplexing configuration configuring the full duplex operation of the first wireless device based on the measurement report.

In some examples, the configuration component 710 may receive the duplexing configuration indicating at least one condition, at least one configuration, or both, in which the first wireless device is to support the full duplex operation.

In some examples, the configuration component 710 may receive the duplexing configuration indicating at least one transmission-receive beam pair on which the first wireless device is to support the full duplex operation.

In some examples, the configuration component 710 may receive the duplexing configuration indicating at least one condition, at least one configuration, or both, on which the first wireless device is to support the full duplex operation using the at least one transmission-receive beam pair.

In some examples, the configuration component 710 may receive the duplexing configuration indicating at least one transmission-receive beam pair on which the first wireless device is not to support the full duplex operation.

In some examples, the configuration component 710 may transmit a configuration request to the second wireless device, where the measurement configuration is based on the configuration request.

In some examples, the configuration component 710 may transmit the configuration request indicating a resource request, a number of beams, or both.

In some examples, the configuration component 710 may receive the measurement configuration that indicates a periodic resource set that indicates the shared resource as a periodic shared resource.

In some examples, the configuration component 710 may receive the measurement configuration indicating a self-measurement gap in which the first wireless device is scheduled to monitor a signal within the self-measurement gap.

In some examples, the configuration component 710 may receive the measurement configuration indicating the self-measurement gap that is a periodic self-measurement gap, a semi-static self-measurement gap, a dynamic self-measurement gap, an event-triggered self-measurement gap, or any combination thereof.

In some examples, the configuration component 710 may receive the measurement configuration indicating a frequency division multiplexing configuration, a code division multiplexing configuration, or both, for the shared resource.

The signal transmission component 715 may transmit, via the shared resource, a first signal via a first transmission beam using a first antenna array of the first wireless device.

In some examples, the signal transmission component 715 may transmit the first signal that is a reference signal, a synchronization signal, a control transmission, a data transmission, or any combination thereof.

In some examples, the signal transmission component 715 may transmit the first signal using a transmission power indicated in the measurement configuration.

In some examples, the signal transmission component 715 may transmit the first signal using the first transmission beam having a beam direction indicated in the measurement configuration.

In some examples, the signal transmission component 715 may transmit the first signal using the first transmission beam having a beam direction pointed in a direction of a reflector.

In some cases, the first wireless device is one of a user equipment or a child IAB node and the second wireless device is one of a base station or a parent IAB node.

In some cases, the first wireless device is an IAB node and the second wireless device is a central unit.

The monitoring component 720 may monitor, in accordance with the measurement configuration, the shared resource using a first receive beam via a second antenna array of the first wireless device.

In some examples, the monitoring component 720 may monitor, in accordance with the measurement configuration, the shared resource using the first receive beam having a beam direction pointed in a direction of a reflector.

In some examples, the monitoring component 720 may monitor, in accordance with the measurement configuration, the shared resource using a set of receive beams via the second antenna array.

In some cases, the set of receive beams corresponds to an active link or a link scheduled to be active within a defined time duration.

In some cases, the report transmission component 725 may communicate with a second wireless device based on the monitoring.

The report transmission component 725 may transmit a measurement report to a second wireless device based on the monitoring.

In some examples, the report transmission component 725 may transmit the measurement report indicating a downlink reference signal measurement, a reference signal measurement, or both, based on the frequency division multiplexing configuration, the code division multiplexing configuration, or both, for the shared resource.

In some examples, the report transmission component 725 may transmit the measurement report that is a periodic measurement report, a semi-static measurement report, a dynamically-generated measurement report, an event triggered measurement report, or any combination thereof.

In some examples, the report transmission component 725 may transmit the measurement report that indicates at least one measurement value.

In some examples, the report transmission component 725 may transmit the measurement report indicating the cross link interference measurement.

In some examples, the report transmission component 725 may transmit the measurement report indicating the reference signal measurement.

In some cases, the at least one measurement value is a received signal strength indicator value, a reference signal receive power value, a signal to interference plus noise value, a channel quality indicator value, a clutter echo delay value, or any combination thereof.

The communication component 730 may communicate, via the shared resource, via the first antenna array and the second antenna array based on the duplexing configuration.

In some examples, the communication component 730 may communicate the uplink transmission, downlink transmission, or both, within the resource based on the control signaling.

The control component 735 may receive, from the base station, control signaling allocating a resource for uplink transmission, downlink transmission, or both, based on the measurement report.

In some examples, the control component 735 may receive, from the central unit, control signaling allocating a resource for scheduling by the IAB node based on the measurement report.

In some examples, the control component 735 may schedule uplink transmission, downlink transmission, or both, within the resource.

The measurement component 740 may generate a cross link interference measurement for the shared resource based on the monitoring.

In some examples, the measurement component 740 may generate a reference signal measurement for the shared resource based on the monitoring.

In some cases, the reference signal measurement is a channel state information reference signal measurement.

FIG. 8 shows a diagram of a system 800 including a device 805 that supports network-assisted self-measurements to enable full duplex operation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a measurement configuration to support full duplex operation using a shared resource, transmit, via the shared resource, a first signal via a first transmission beam using a first antenna array of the first wireless device, monitor, in accordance with the measurement configuration, the shared resource using a first receive beam via a second antenna array of the first wireless device, and transmit a measurement report to a second wireless device based on the monitoring.

The communications manager 810 may receive a measurement configuration to support full duplex operation using a shared resource, and communicate with the second wireless device based on the measurement configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting network-assisted self-measurements to enable full duplex operation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
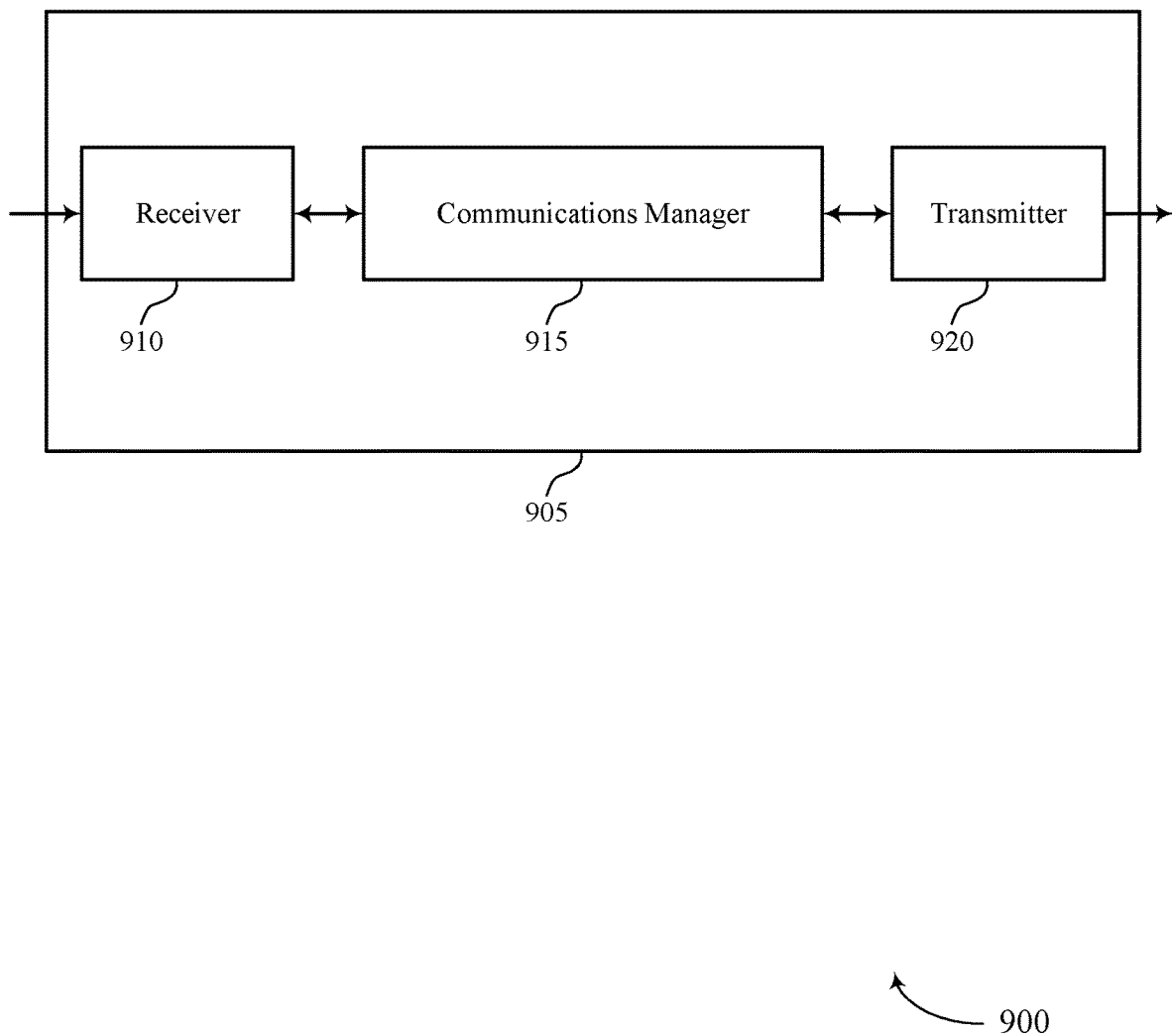
FIGS. 9 and 10 show block diagrams of devices that support network-assisted self-measurements to enable full duplex operation in accordance with aspects of the present disclosure.

FIG. 9 shows a block diagram 900 of a device 905 that supports network-assisted self-measurements to enable full duplex operation in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to network-assisted self-measurements to enable full duplex operation, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a second wireless device, a measurement configuration to support full duplex operation using a shared resource, receive a measurement report from the second wireless device based on the measurement configuration, and transmit a duplexing configuration configuring the full duplex operation of the second wireless device based on the measurement report. The communications manager 915 may communicate with the second wireless device based on the measurement configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
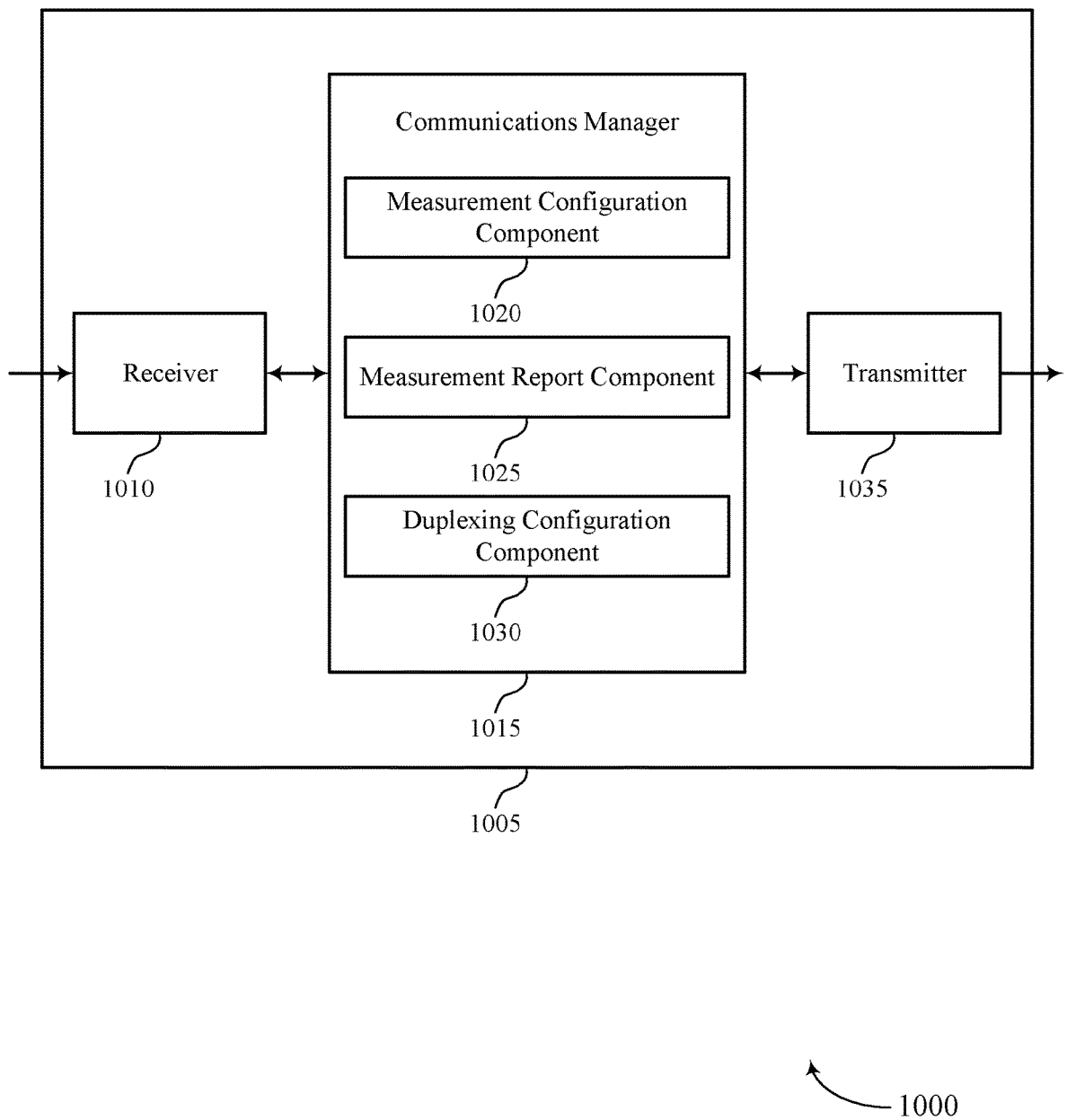

FIG. 10 shows a block diagram 1000 of a device 1005 that supports network-assisted self-measurements to enable full duplex operation in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to network-assisted self-measurements to enable full duplex operation, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a measurement configuration component 1020, a measurement report component 1025, and a duplexing configuration component 1030. The communications manager 1015 may be an example of aspects of the communications manager 1210 described herein.

The measurement configuration component 1020 may transmit, to a second wireless device, a measurement configuration to support full duplex operation using a shared resource.

The measurement report component 1025 may receive a measurement report from the second wireless device based on the measurement configuration.

The duplexing configuration component 1030 may transmit a duplexing configuration configuring the full duplex operation of the second wireless device based on the measurement report. The duplexing configuration component 1030 may also communicate with the second wireless device based on the measurement configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
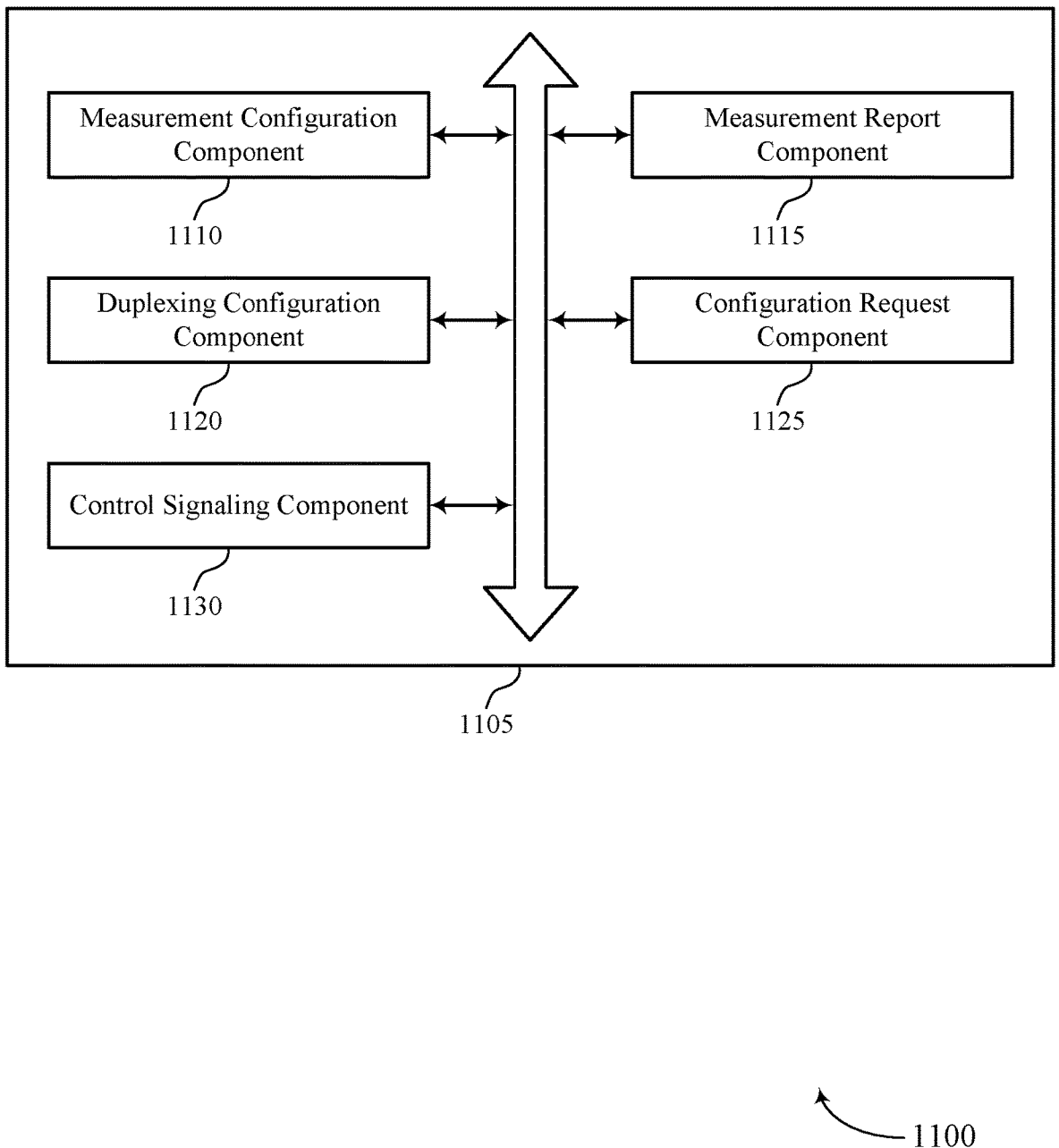
FIG. 11 shows a block diagram of a communications manager that supports network-assisted self-measurements to enable full duplex operation in accordance with aspects of the present disclosure.

FIG. 11 shows a block diagram 1100 of a communications manager 1105 that supports network-assisted self-measurements to enable full duplex operation in accordance with aspects of the present disclosure. The communications manager 1105 may be an example of aspects of a communications manager 915, a communications manager 1015, or a communications manager 1210 described herein. The communications manager 1105 may include a measurement configuration component 1110, a measurement report component 1115, a duplexing configuration component 1120, a configuration request component 1125, and a control signaling component 1130. Each of these modules may communicate, directly or indirectly, with one another (e.g., via one or more buses).

The measurement configuration component 1110 may transmit, to a second wireless device, a measurement configuration to support full duplex operation using a shared resource.

In some examples, the measurement configuration component 1110 may transmit the measurement configuration that indicates a periodic resource set that indicates the shared resource as a periodic shared resource.

In some examples, the measurement configuration component 1110 may transmit the measurement configuration indicating a self-measurement gap in which the second wireless device is scheduled to monitor a signal within the self-measurement gap.

In some examples, the measurement configuration component 1110 may transmit the measurement configuration indicating the self-measurement gap that is a periodic self-measurement gap, a semi-static self-measurement gap, a dynamic self-measurement gap, an event-triggered self-measurement gap, or any combination thereof.

In some examples, the measurement configuration component 1110 may transmit the measurement configuration indicating a frequency division multiplexing configuration, a code division multiplexing configuration, or both, for the shared resource.

In some cases, the first wireless device is one of a base station or a parent IAB node and the second wireless device is one of a user equipment or a child IAB node.

In some cases, the first wireless device is a central unit and the second wireless device is an IAB node.

The measurement report component 1115 may receive a measurement report from the second wireless device based on the measurement configuration.

In some examples, the measurement report component 1115 may receive the measurement report indicating a downlink reference signal measurement, a reference signal measurement, or both, based on the frequency division multiplexing configuration, the code division multiplexing configuration, or both, for the shared resource.

In some examples, the measurement report component 1115 may receive the measurement report that is a periodic measurement report, a semi-static measurement report, a dynamically-generated measurement report, an event triggered measurement report, or any combination thereof.

In some examples, the measurement report component 1115 may receive the measurement report that indicates at least one measurement value.

In some examples, the measurement report component 1115 may receive the measurement report indicating a cross link interference measurement.

In some examples, the measurement report component 1115 may receive the measurement report indicating a reference signal measurement.

In some cases, the at least one measurement value is a received signal strength indicator value, a reference signal receive power value, a signal to interference plus noise value, a channel quality indicator value, a clutter echo delay value, or any combination thereof.

In some cases, the reference signal measurement is a channel state information reference signal measurement.

The duplexing configuration component 1120 may transmit a duplexing configuration configuring the full duplex operation of the second wireless device based on the measurement report.

In some examples, the duplexing configuration component 1120 may transmit the duplexing configuration indicating at least one condition, at least one configuration, or both, in which the second wireless device is to support the full duplex operation.

In some examples, the duplexing configuration component 1120 may transmit the duplexing configuration indicating at least one transmission-receive beam pair on which the second wireless device is to support the full duplex operation.

In some examples, the duplexing configuration component 1120 may transmit the duplexing configuration indicating at least one condition, at least one configuration, or both, on which the second wireless device is to support the full duplex operation using the at least one transmission-receive beam pair.

In some examples, the duplexing configuration component 1120 may transmit the duplexing configuration indicating at least one transmission-receive beam pair on which the second wireless device is not to support the full duplex operation.

The configuration request component 1125 may receive a configuration request from the second wireless device, where the measurement configuration is based on the configuration request.

In some examples, the configuration request component 1125 may receive the configuration request indicating a resource request, a number of beams, or both.

The control signaling component 1130 may transmit, from the base station, control signaling allocating a resource for uplink transmission, downlink transmission, or both, based on the measurement report.

In some examples, the control signaling component 1130 may communicate the uplink transmission, downlink transmission, or both, within the resource based on the control signaling.

In some examples, the control signaling component 1130 may receive, from the central unit, control signaling allocating a resource for scheduling by the IAB node based on the measurement report.

In some examples, the control signaling component 1130 may schedule uplink transmission, downlink transmission, or both, within the resource.

Figure 12:
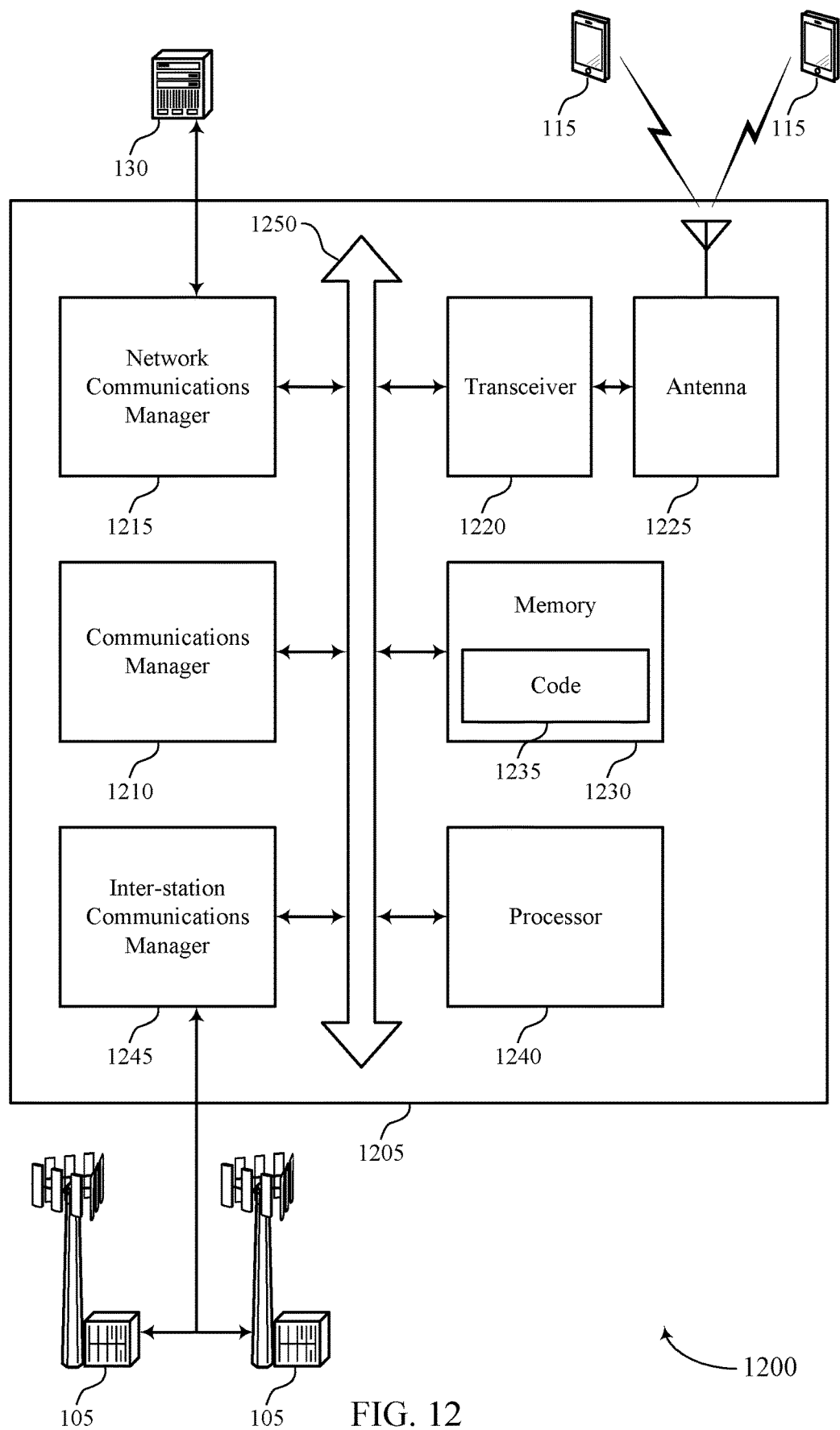
FIG. 12 shows a diagram of a system including a device that supports network-assisted self-measurements to enable full duplex operation in accordance with aspects of the present disclosure.

FIG. 12 shows a diagram of a system 1200 including a device 1205 that supports network-assisted self-measurements to enable full duplex operation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a second wireless device, a measurement configuration to support full duplex operation using a shared resource, receive a measurement report from the second wireless device based on the measurement configuration, and transmit a duplexing configuration configuring the full duplex operation of the second wireless device based on the measurement report.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting network-assisted self-measurements to enable full duplex operation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
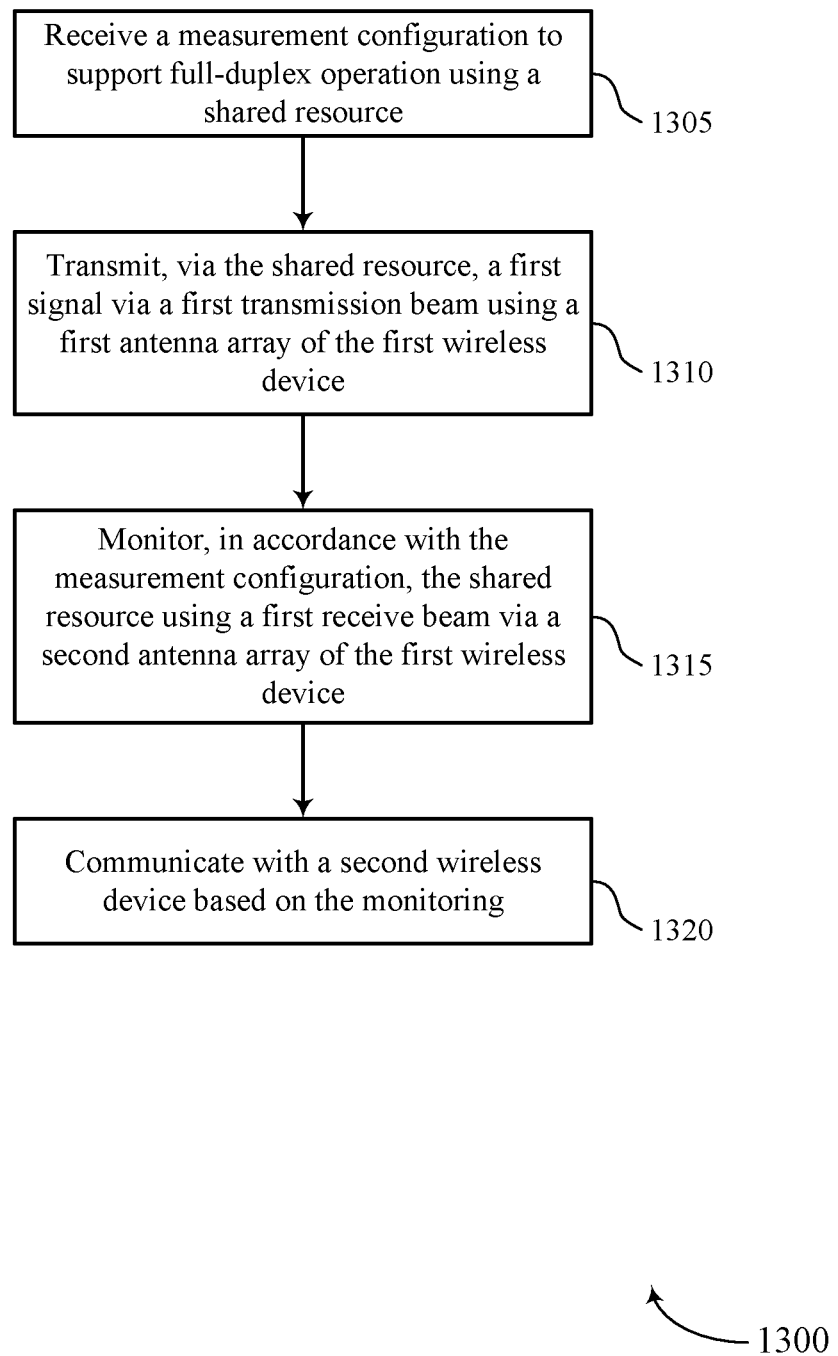
FIGS. 13 through 16 show flowcharts illustrating methods that support network-assisted self-measurements to enable full duplex operation in accordance with aspects of the present disclosure.

FIG. 13 shows a flowchart illustrating a method 1300 that supports network-assisted self-measurements to enable full duplex operation in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive a measurement configuration to support full duplex operation using a shared resource. The operations of 1305 may be performed according to the methods described herein. In some examples, aspects of the operations of 1305 may be performed by a configuration component as described with reference to FIGS. 5 through 8.

At 1310, the UE may transmit, via the shared resource, a first signal via a first transmission beam using a first antenna array of the first wireless device. The operations of 1310 may be performed according to the methods described herein. In some examples, aspects of the operations of 1310 may be performed by a signal transmission component as described with reference to FIGS. 5 through 8.

At 1315, the UE may monitor, in accordance with the measurement configuration, the shared resource using a first receive beam via a second antenna array of the first wireless device. The operations of 1315 may be performed according to the methods described herein. In some examples, aspects of the operations of 1315 may be performed by a monitoring component as described with reference to FIGS. 5 through 8.

At 1320, the UE may communicate with a second wireless device based on the monitoring. In some cases, the UE may transmit a measurement report to a second wireless device based on the monitoring. The operations of 1320 may be performed according to the methods described herein. In some examples, aspects of the operations of 1320 may be performed by a report transmission component as described with reference to FIGS. 5 through 8.

Figure 14:
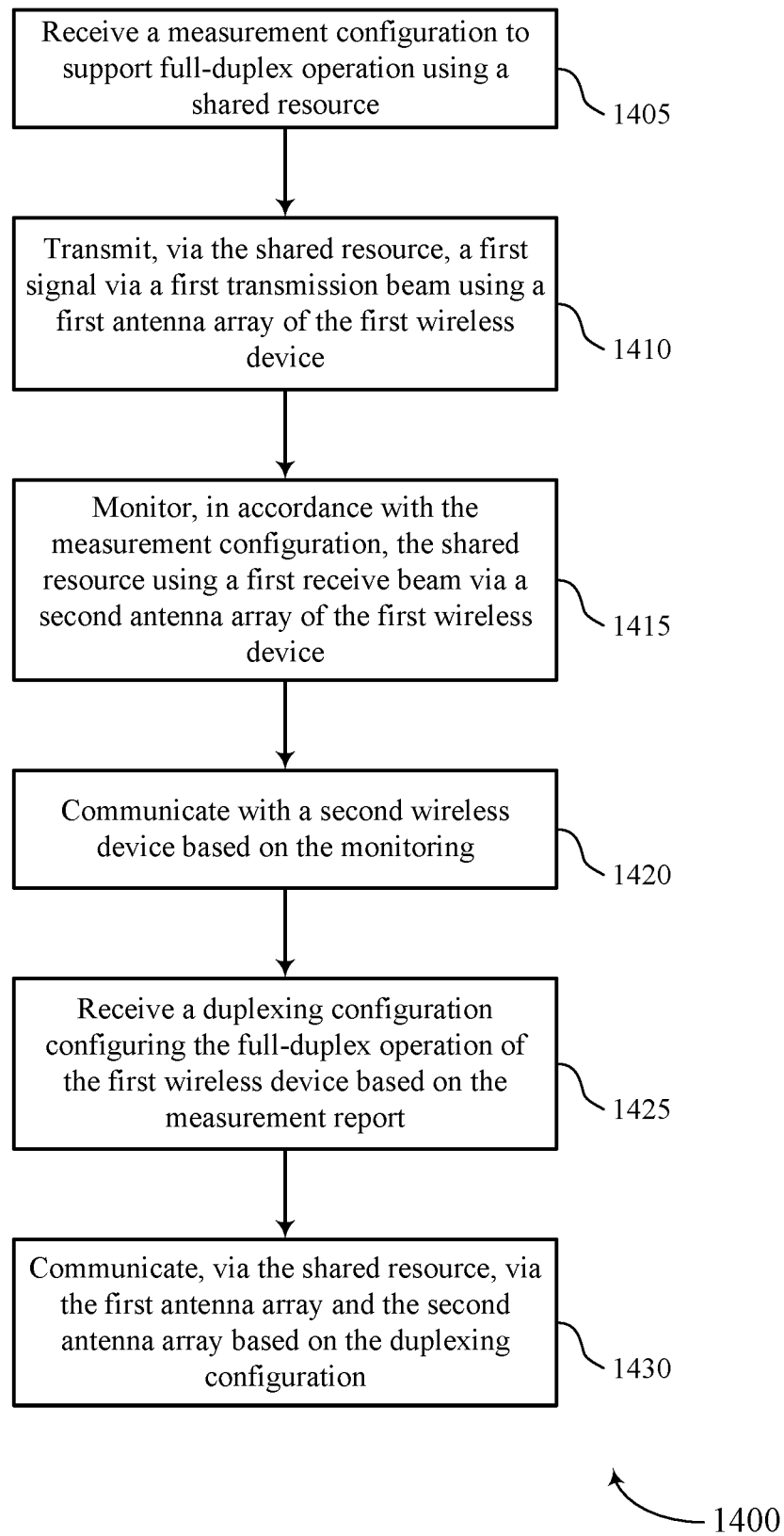

FIG. 14 shows a flowchart illustrating a method 1400 that supports network-assisted self-measurements to enable full duplex operation in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive a measurement configuration to support full duplex operation using a shared resource. The operations of 1405 may be performed according to the methods described herein. In some examples, aspects of the operations of 1405 may be performed by a configuration component as described with reference to FIGS. 5 through 8.

At 1410, the UE may transmit, via the shared resource, a first signal via a first transmission beam using a first antenna array of the first wireless device. The operations of 1410 may be performed according to the methods described herein. In some examples, aspects of the operations of 1410 may be performed by a signal transmission component as described with reference to FIGS. 5 through 8.

At 1415, the UE may monitor, in accordance with the measurement configuration, the shared resource using a first receive beam via a second antenna array of the first wireless device. The operations of 1415 may be performed according to the methods described herein. In some examples, aspects of the operations of 1415 may be performed by a monitoring component as described with reference to FIGS. 5 through 8.

At 1420, the UE may transmit a measurement report to a second wireless device based on the monitoring. The operations of 1420 may be performed according to the methods described herein. In some examples, aspects of the operations of 1420 may be performed by a report transmission component as described with reference to FIGS. 5 through 8.

At 1425, the UE may receive a duplexing configuration configuring the full duplex operation of the first wireless device based on the measurement report. The operations of 1425 may be performed according to the methods described herein. In some examples, aspects of the operations of 1425 may be performed by a configuration component as described with reference to FIGS. 5 through 8.

At 1430, the UE may communicate, via the shared resource, via the first antenna array and the second antenna array based on the duplexing configuration. The operations of 1430 may be performed according to the methods described herein. In some examples, aspects of the operations of 1430 may be performed by a communication component as described with reference to FIGS. 5 through 8.

Figure 15:
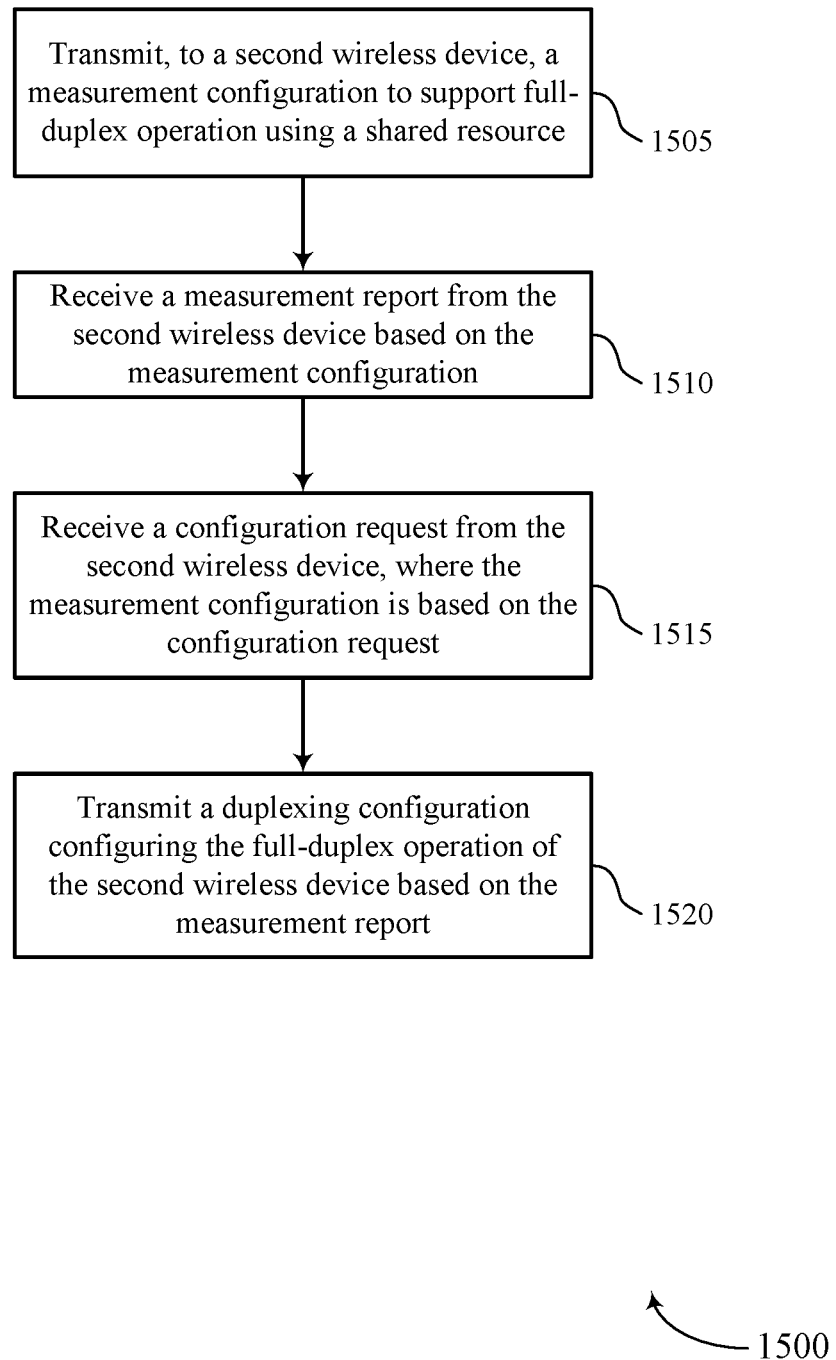

FIG. 15 shows a flowchart illustrating a method 1500 that supports network-assisted self-measurements to enable full duplex operation in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a second wireless device, a measurement configuration to support full duplex operation using a shared resource. The operations of 1505 may be performed according to the methods described herein. In some examples, aspects of the operations of 1505 may be performed by a measurement configuration component as described with reference to FIGS. 9 through 12.

At 1510, the base station may receive a measurement report from the second wireless device based on the measurement configuration. The operations of 1510 may be performed according to the methods described herein. In some examples, aspects of the operations of 1510 may be performed by a measurement report component as described with reference to FIGS. 9 through 12.

At 1515, the base station may receive a configuration request from the second wireless device, where the measurement configuration is based on the configuration request. The operations of 1515 may be performed according to the methods described herein. In some examples, aspects of the operations of 1515 may be performed by a configuration request component as described with reference to FIGS. 9 through 12.

At 1520, the base station may transmit a duplexing configuration configuring the full duplex operation of the second wireless device based on the measurement report. The operations of 1520 may be performed according to the methods described herein. In some examples, aspects of the operations of 1520 may be performed by a duplexing configuration component as described with reference to FIGS. 9 through 12.

Figure 16:
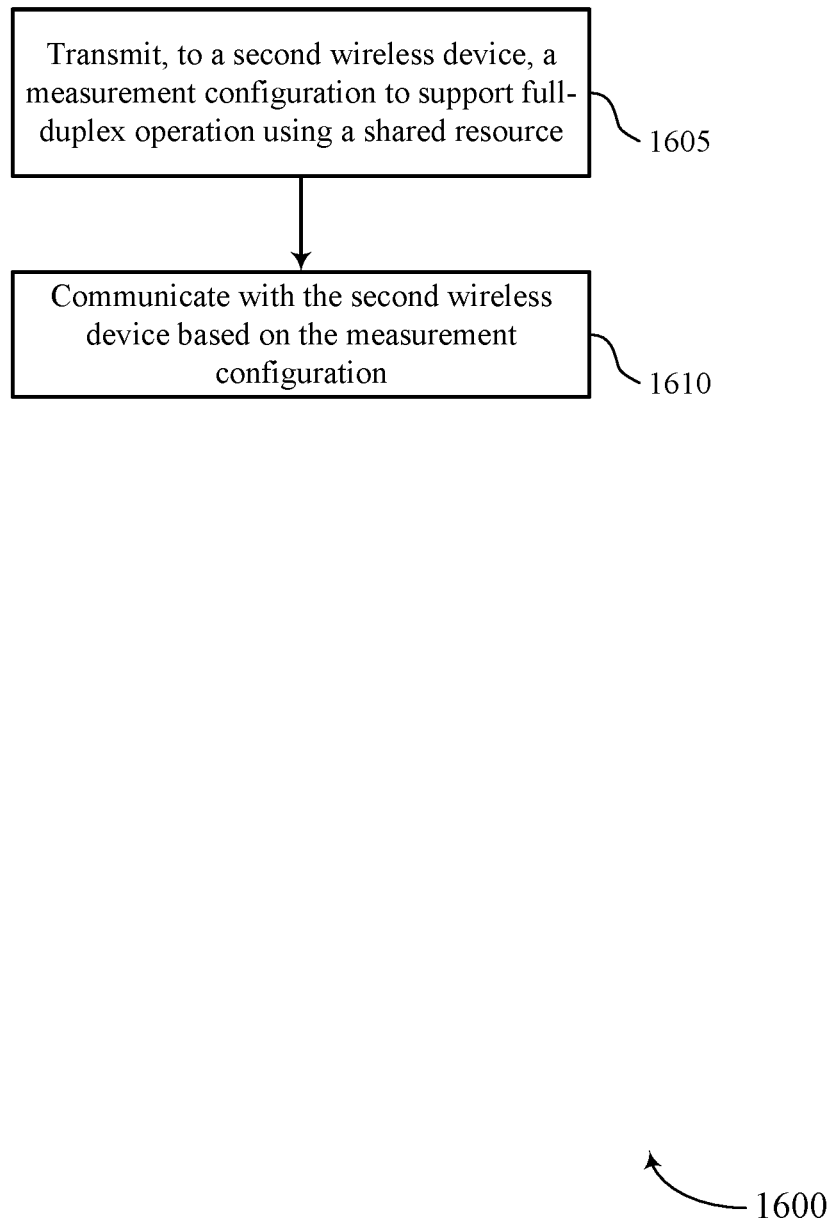

FIG. 16 shows a flowchart illustrating a method 1600 that supports network-assisted self-measurements to enable full duplex operation in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein Additionally or alternatively, a base station may perform aspects of the functions described herein using special-purpose hardware.

At 1605, the base station may transmit, to a second wireless device, a measurement configuration to support full duplex operation using a shared resource. The operations of 1605 may be performed according to the methods described herein. In some examples, aspects of the operations of 1605 may be performed by a measurement configuration component as described with reference to FIGS. 9 through 12.

At 1610, the base station may communicate with the second wireless device based on the measurement configuration. In some cases, the base station may receive a measurement report from the second wireless device based on the measurement configuration. The operations of 1610 may be performed according to the methods described herein. In some examples, aspects of the operations of 1610 may be performed by a measurement report component as described with reference to FIGS. 9 through 12.

The following provides an overview of aspects of the present disclosure:

Aspect 1: A method for wireless communications by a first wireless device, comprising: receiving a measurement configuration to support full duplex operation using a shared resource; transmitting, via the shared resource, a first signal via a first transmission beam using a first antenna array of the first wireless device; monitoring, in accordance with the measurement configuration, the shared resource using a first receive beam via a second antenna array of the first wireless device; and communicating with a second wireless device based at least in part on the monitoring.

Aspect 2: The method of aspect 1, wherein the communicating comprises: transmitting a measurement report to the second wireless device based at least in part on the monitoring.

Aspect 3: The method of aspect 2, further comprising: receiving a duplexing configuration configuring the full duplex operation of the first wireless device based at least in part on the measurement report; and communicating, via the shared resource, via the first antenna array and the second antenna array based at least in part on the duplexing configuration.

Aspect 4: The method of aspect 3, wherein receiving the duplexing configuration comprises: receiving the duplexing configuration indicating at least one condition, at least one configuration, or both, in which the first wireless device is to support the full duplex operation.

Aspect 5: The method of any of aspects 3 through 4, wherein receiving the duplexing configuration comprises: receiving the duplexing configuration indicating at least one transmission-receive beam pair on which the first wireless device is to support the full duplex operation.

Aspect 6: The method of aspect 5, wherein receiving the duplexing configuration comprises: receiving the duplexing configuration indicating at least one condition, at least one configuration, or both, on which the first wireless device is to support the full duplex operation using the at least one transmission-receive beam pair.

Aspect 7: The method of any of aspects 5 through 6, wherein receiving the duplexing configuration comprises: receiving the duplexing configuration indicating at least one transmission-receive beam pair on which the first wireless device is not to support the full duplex operation.

Aspect 8: The method of any of aspects 1 through 7, wherein transmitting the first signal comprises: transmitting the first signal that is a reference signal, a synchronization signal, a control transmission, a data transmission, or any combination thereof.

Aspect 9: The method of any of aspects 1 through 8, wherein transmitting the first signal comprises: transmitting the first signal using a transmission power indicated in the measurement configuration.

Aspect 10: The method of any of aspects 1 through 9, wherein transmitting the first signal comprises: transmitting the first signal using the first transmission beam having a beam direction indicated in the measurement configuration.

Aspect 11: The method of any of aspects 1 through 10, wherein transmitting the first signal comprises: transmitting the first signal using the first transmission beam having a beam direction pointed in a direction of a reflector.

Aspect 12: The method of any of aspects 1 through 11, wherein monitoring the shared resource comprises: monitoring, in accordance with the measurement configuration, the shared resource using the first receive beam having a beam direction pointed in a direction of a reflector.

Aspect 13: The method of any of aspects 1 through 12, wherein monitoring the shared resource comprises: monitoring, in accordance with the measurement configuration, the shared resource using a plurality of receive beams via the second antenna array.

Aspect 14: The method of aspect 13, wherein the plurality of receive beams corresponds to an active link or a link scheduled to be active within a defined time duration.

Aspect 15: The method of any of aspects 1 through 14, further comprising: transmitting a configuration request to the second wireless device, wherein the measurement configuration is based at least in part on the configuration request.

Aspect 16: The method of aspect 15, wherein transmitting the configuration request comprises: transmitting the configuration request indicating a resource request, a number of beams, or both.

Aspect 17: The method of any of aspects 1 through 16, wherein receiving the measurement configuration comprises: receiving the measurement configuration that indicates a periodic resource set that indicates the shared resource as a periodic shared resource.

Aspect 18: The method of any of aspects 1 through 17, wherein receiving the measurement configuration comprises: receiving the measurement configuration indicating a self-measurement gap in which the first wireless device is scheduled to monitor a signal within the self-measurement gap.

Aspect 19: The method of aspect 18, wherein receiving the measurement configuration comprises: receiving the measurement configuration indicating the self-measurement gap that is a periodic self-measurement gap, a semi-static self-measurement gap, a dynamic self-measurement gap, an event-triggered self-measurement gap, or any combination thereof.

Aspect 20: The method of any of aspects 1 through 19, wherein receiving the measurement configuration comprises: receiving the measurement configuration indicating a frequency division multiplexing configuration, a code division multiplexing configuration, or both, for the shared resource.

Aspect 21: The method of aspect 20, wherein communicating with the second wireless device comprises: transmitting a measurement report indicating a downlink reference signal measurement, a reference signal measurement, or both, based at least in part on the frequency division multiplexing configuration, the code division multiplexing configuration, or both, for the shared resource.

Aspect 22: The method of any of aspects 1 through 21, wherein communicating with the second wireless device comprises: transmitting a measurement report that is a periodic measurement report, a semi-static measurement report, a dynamically-generated measurement report, an event triggered measurement report, or any combination thereof.

Aspect 23: The method of any of aspects 1 through 22, wherein communicating with the second wireless device comprises: transmitting a measurement report that indicates at least one measurement value.

Aspect 24: The method of aspect 23, wherein the at least one measurement value is a received signal strength indicator value, a reference signal receive power value, a signal to interference plus noise value, a channel quality indicator value, a clutter echo delay value, or any combination thereof.

Aspect 25: The method of any of aspects 1 through 24, wherein the first wireless device is one of a user equipment or a child IAB node and the second wireless device is one of a base station or a parent IAB node.

Aspect 26: The method of aspect 25, further comprising: receiving, from the base station, control signaling allocating a resource for uplink transmission, downlink transmission; and communicating the uplink transmission, downlink transmission, or both, within the resource based at least in part on the control signaling.

Aspect 27: The method of any of aspects 1 through 26, wherein the first wireless device is an IAB node and the second wireless device is a central unit.

Aspect 28: The method of aspect 27, further comprising: receiving, from the central unit, control signaling allocating a resource for scheduling by the IAB node; and scheduling uplink transmission, downlink transmission, or both, within the resource.

Aspect 29: The method of any of aspects 1 through 28, further comprising: generating a cross link interference measurement for the shared resource based at least in part on the monitoring.

Aspect 30: The method of aspect 29, further comprising: transmitting a measurement report indicating the cross link interference measurement.

Aspect 31: The method of any of aspects 1 through 30, further comprising: generating a reference signal measurement for the shared resource based at least in part on the monitoring.

Aspect 32: The method of aspect 31, wherein further comprising: transmitting a measurement report indicating the reference signal measurement.

Aspect 33: The method of any of aspects 31 through 32, wherein the reference signal measurement is a channel state information reference signal measurement.

Aspect 34: A method for wireless communications by a first wireless device, comprising: transmitting, to a second wireless device, a measurement configuration to support full duplex operation using a shared resource; and communicating with the second wireless device based at least in part on the measurement configuration.

Aspect 35: The method of aspect 34, further comprising: receiving a measurement report from the second wireless device based at least in part on the measurement configuration.

Aspect 36: The method of aspect 35, wherein the communicating comprises: transmitting a duplexing configuration configuring the full duplex operation of the second wireless device based at least in part on the measurement report.

Aspect 37: The method of aspect 36, wherein transmitting the duplexing configuration comprises: transmitting the duplexing configuration indicating at least one condition, at least one configuration, or both, in which the second wireless device is to support the full duplex operation.

Aspect 38: The method of any of aspects 36 through 37, wherein transmitting the duplexing configuration comprises: transmitting the duplexing configuration indicating at least one transmission-receive beam pair on which the second wireless device is to support the full duplex operation.

Aspect 39: The method of aspect 38, wherein transmitting the duplexing configuration comprises: transmitting the duplexing configuration indicating at least one condition, at least one configuration, or both, on which the second wireless device is to support the full duplex operation using the at least one transmission-receive beam pair.

Aspect 40: The method of any of aspects 38 through 39, wherein transmitting the duplexing configuration comprises: transmitting the duplexing configuration indicating at least one transmission-receive beam pair on which the second wireless device is not to support the full duplex operation.

Aspect 41: The method of any of aspects 35 through 40, wherein receiving the measurement report comprises: receiving the measurement report that is a periodic measurement report, a semi-static measurement report, a dynamically-generated measurement report, an event triggered measurement report, or any combination thereof.

Aspect 42: The method of any of aspects 35 through 41, wherein receiving the measurement report comprises: receiving the measurement report that indicates at least one measurement value.

Aspect 43: The method of aspect 42, wherein the at least one measurement value is a received signal strength indicator value, a reference signal receive power value, a signal to interference plus noise value, a channel quality indicator value, a clutter echo delay value, or any combination thereof.

Aspect 44: The method of any of aspects 35 through 43, wherein receiving the measurement report comprises: receiving the measurement report indicating a cross link interference measurement.

Aspect 45: The method of any of aspects 35 through 44, wherein receiving the measurement report comprises: receiving the measurement report indicating a reference signal measurement.

Aspect 46: The method of aspect 45, wherein the reference signal measurement is a channel state information reference signal measurement.

Aspect 47: The method of any of aspects 34 through 46, further comprising: receiving a configuration request from the second wireless device, wherein the measurement configuration is based at least in part on the configuration request.

Aspect 48: The method of aspect 47, wherein receiving the configuration request comprises: receiving the configuration request indicating a resource request, a number of beams, or both.

Aspect 49: The method of any of aspects 34 through 48, wherein transmitting the measurement configuration comprises: transmitting the measurement configuration that indicates a periodic resource set that indicates the shared resource as a periodic shared resource.

Aspect 50: The method of any of aspects 34 through 49, wherein transmitting the measurement configuration comprises: transmitting the measurement configuration indicating a self-measurement gap in which the second wireless device is scheduled to monitor a signal within the self-measurement gap.

Aspect 51: The method of aspect 50, wherein transmitting the measurement configuration comprises: transmitting the measurement configuration indicating the self-measurement gap that is a periodic self-measurement gap, a semi-static self-measurement gap, a dynamic self-measurement gap, an event-triggered self-measurement gap, or any combination thereof.

Aspect 52: The method of any of aspects 34 through 51, wherein transmitting the measurement configuration comprises: transmitting the measurement configuration indicating a frequency division multiplexing configuration, a code division multiplexing configuration, or both, for the shared resource.

Aspect 53: The method of aspect 52, further comprising: receiving a measurement report indicating a downlink reference signal measurement, a reference signal measurement, or both, based at least in part on the frequency division multiplexing configuration, the code division multiplexing configuration, or both, for the shared resource.

Aspect 54: The method of any of aspects 34 through 53, wherein the first wireless device is one of a base station or a parent IAB node and the second wireless device is one of a user equipment or a child IAB node.

Aspect 55: The method of aspect 54, further comprising: transmitting, from the base station, control signaling allocating a resource for uplink transmission, downlink transmission, or both, based at least in part on the measurement report; and communicating the uplink transmission, downlink transmission, or both, within the resource based at least in part on the control signaling.

Aspect 56: The method of any of aspects 34 through 55, wherein the first wireless device is a central unit and the second wireless device is an IAB node.

Aspect 57: The method of aspect 56, further comprising: receiving, from the central unit, control signaling allocating a resource for scheduling by the IAB node based at least in part on the measurement report; and scheduling uplink transmission, downlink transmission, or both, within the resource.

Aspect 58: An apparatus for wireless communications by a first wireless device, comprising a processor; memory coupled with the processor; and instructions stored in the memory and executable by the processor to cause the apparatus to perform a method of any of aspects 1 through 33.

Aspect 59: An apparatus for wireless communications by a first wireless device, comprising at least one means for performing a method of any of aspects 1 through 33.

Aspect 60: A non-transitory computer-readable medium storing code for wireless communications by a first wireless device, the code comprising instructions executable by a processor to perform a method of any of aspects 1 through 33.

Aspect 61: An apparatus for wireless communications by a first wireless device, comprising a processor; memory coupled with the processor; and instructions stored in the memory and executable by the processor to cause the apparatus to perform a method of any of aspects 34 through 57.

Aspect 62: An apparatus for wireless communications by a first wireless device, comprising at least one means for performing a method of any of aspects 34 through 57.

Aspect 63: A non-transitory computer-readable medium storing code for wireless communications by a first wireless device, the code comprising instructions executable by a processor to perform a method of any of aspects 34 through 57.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first wireless device, comprising:
   receiving a measurement configuration to support full duplex operation using a shared resource;
   transmitting, via the shared resource, a first signal via a first transmission beam using a first antenna array of the first wireless device;
   monitoring, in accordance with the measurement configuration, the shared resource using a first receive beam via a second antenna array of the first wireless device, the first receive beam being based at least in part on the measurement configuration; and
   communicating with a second wireless device based at least in part on the monitoring.

2. The method of claim 1, wherein communicating comprises:
   transmitting a measurement report to the second wireless device based at least in part on the monitoring.

3. The method of claim 2, further comprising:
receiving a duplexing configuration configuring the full duplex operation of the first wireless device based at least in part on the measurement report; and
communicating, via the shared resource, via the first antenna array and the second antenna array based at least in part on the duplexing configuration.

4. The method of claim 3, wherein receiving the duplexing configuration comprises:
receiving the duplexing configuration indicating at least one condition, at least one configuration, or both, in which the first wireless device is to support the full duplex operation.

5. The method of claim 3, wherein receiving the duplexing configuration comprises:
receiving the duplexing configuration indicating at least one transmission-receive beam pair on which the first wireless device is to support the full duplex operation.

6. The method of claim 5, wherein receiving the duplexing configuration comprises:
receiving the duplexing configuration indicating at least one condition, at least one configuration, or both, on which the first wireless device is to support the full duplex operation using the at least one transmission-receive beam pair.

7. The method of claim 5, wherein receiving the duplexing configuration comprises:
receiving the duplexing configuration indicating at least one transmission-receive beam pair on which the first wireless device is not to support the full duplex operation.

8. The method of claim 1, wherein transmitting the first signal comprises:
transmitting the first signal that is a reference signal, a synchronization signal, a control transmission, a data transmission, or any combination thereof.

9. The method of claim 1, wherein transmitting the first signal comprises:
transmitting the first signal using a transmission power indicated in the measurement configuration.

10. The method of claim 1, wherein transmitting the first signal comprises:
transmitting the first signal using the first transmission beam having a beam direction indicated in the measurement configuration.

11. The method of claim 1, wherein transmitting the first signal comprises:
transmitting the first signal using the first transmission beam having a beam direction pointed in a direction of a reflector.

12. The method of claim 1, wherein monitoring the shared resource comprises:
monitoring, in accordance with the measurement configuration, the shared resource using the first receive beam having a beam direction pointed in a direction of a reflector.

13. The method of claim 1, wherein monitoring the shared resource comprises:
monitoring, in accordance with the measurement configuration, the shared resource using a plurality of receive beams via the second antenna array.

14. The method of claim 13, wherein the plurality of receive beams corresponds to an active link or a link scheduled to be active within a defined time duration.

15. The method of claim 1, further comprising:
transmitting a configuration request to the second wireless device, wherein the measurement configuration is based at least in part on the configuration request.

16. The method of claim 15, wherein transmitting the configuration request comprises:
transmitting the configuration request indicating a resource request, a number of beams, or both.

17. The method of claim 1, wherein receiving the measurement configuration comprises:
receiving the measurement configuration that indicates a periodic resource set that indicates the shared resource as a periodic shared resource.

18. The method of claim 1, wherein receiving the measurement configuration comprises:
receiving the measurement configuration indicating a self-measurement gap in which the first wireless device is scheduled to monitor a signal within the self-measurement gap.

19. The method of claim 18, wherein receiving the measurement configuration comprises:
receiving the measurement configuration indicating the self-measurement gap that is a periodic self-measurement gap, a semi-static self-measurement gap, a dynamic self-measurement gap, an event-triggered self-measurement gap, or any combination thereof.

20. The method of claim 1, wherein receiving the measurement configuration comprises:
receiving the measurement configuration indicating a frequency division multiplexing configuration, a code division multiplexing configuration, or both, for the shared resource.

21. The method of claim 20, wherein communicating with the second wireless device comprises:
transmitting a measurement report indicating a downlink reference signal measurement, a reference signal measurement, or both, based at least in part on the frequency division multiplexing configuration, the code division multiplexing configuration, or both, for the shared resource.

22. The method of claim 1, wherein communicating with the second wireless device comprises:
transmitting a measurement report that is a periodic measurement report, a semi-static measurement report, a dynamically-generated measurement report, an event triggered measurement report, or any combination thereof.

23. The method of claim 1, wherein communicating with the second wireless device comprises:
transmitting a measurement report that indicates at least one measurement value.

24. The method of claim 23, wherein the at least one measurement value is a received signal strength indicator value, a reference signal receive power value, a signal to interference plus noise value, a channel quality indicator value, a clutter echo delay value, or any combination thereof.

25. The method of claim 1, wherein the first wireless device is one of a user equipment or a child integrated access and backhaul node and the second wireless device is one of a base station or a parent integrated access and backhaul node.

26. The method of claim 25, further comprising:
receiving, from the base station, control signaling allocating a resource for uplink transmission, downlink transmission; and communicating the uplink transmission, downlink transmission, or both, within the resource based at least in part on the control signaling.

27. The method of claim 1, wherein the first wireless device is an integrated access and backhaul node and the second wireless device is a central unit.

28. The method of claim 27, further comprising:
receiving, from the central unit, control signaling allocating a resource for scheduling by the integrated access and backhaul node; and
scheduling uplink transmission, downlink transmission, or both, within the resource.

29. The method of claim 1, further comprising:
generating a cross link interference measurement for the shared resource based at least in part on the monitoring.

30. The method of claim 29, further comprising:
transmitting a measurement report indicating the cross link interference measurement.

31. The method of claim 1, further comprising:
generating a reference signal measurement for the shared resource based at least in part on the monitoring.

32. The method of claim 31, wherein further comprising:
transmitting a measurement report indicating the reference signal measurement.

33. The method of claim 31, wherein the reference signal measurement is a channel state information reference signal measurement.

34. A method for wireless communications by a first wireless device, comprising:
transmitting, to a second wireless device, a measurement configuration to support full duplex operation using a shared resource, wherein the measurement configuration is indicative of a first receive beam that is to be used for monitoring the shared resource by the second wireless device; and
communicating with the second wireless device based at least in part on the measurement configuration.

35. The method of claim 34, further comprising:
receiving a measurement report from the second wireless device based at least in part on the measurement configuration.

36. The method of claim 35, wherein communicating comprises:
transmitting a duplexing configuration configuring the full duplex operation of the second wireless device based at least in part on the measurement report.

37. The method of claim 36, wherein transmitting the duplexing configuration comprises:
transmitting the duplexing configuration indicating at least one condition, at least one configuration, or both, in which the second wireless device is to support the full duplex operation.

38. The method of claim 36, wherein transmitting the duplexing configuration comprises:
transmitting the duplexing configuration indicating at least one transmission-receive beam pair on which the second wireless device is to support the full duplex operation.

39. The method of claim 38, wherein transmitting the duplexing configuration comprises:
transmitting the duplexing configuration indicating at least one condition, at least one configuration, or both, on which the second wireless device is to support the full duplex operation using the at least one transmission-receive beam pair.

40. The method of claim 38, wherein transmitting the duplexing configuration comprises:
transmitting the duplexing configuration indicating at least one transmission-receive beam pair on which the second wireless device is not to support the full duplex operation.

41. The method of claim 35, wherein receiving the measurement report comprises:
receiving the measurement report that is a periodic measurement report, a semi-static measurement report, a dynamically-generated measurement report, an event triggered measurement report, or any combination thereof.

42. The method of claim 35, wherein receiving the measurement report comprises:
receiving the measurement report that indicates at least one measurement value.

43. The method of claim 42, wherein the at least one measurement value is a received signal strength indicator value, a reference signal receive power value, a signal to interference plus noise value, a channel quality indicator value, a clutter echo delay value, or any combination thereof.

44. The method of claim 35, wherein receiving the measurement report comprises:
receiving the measurement report indicating a cross link interference measurement.

45. The method of claim 35, wherein receiving the measurement report comprises:
receiving the measurement report indicating a reference signal measurement.

46. The method of claim 45, wherein the reference signal measurement is a channel state information reference signal measurement.

47. The method of claim 34, further comprising:
receiving a configuration request from the second wireless device, wherein the measurement configuration is based at least in part on the configuration request.

48. The method of claim 47, wherein receiving the configuration request comprises:
receiving the configuration request indicating a resource request, a number of beams, or both.

49. The method of claim 34, wherein transmitting the measurement configuration comprises:
transmitting the measurement configuration that indicates a periodic resource set that indicates the shared resource as a periodic shared resource.

50. The method of claim 34, wherein transmitting the measurement configuration comprises:
transmitting the measurement configuration indicating a self-measurement gap in which the second wireless device is scheduled to monitor a signal within the self-measurement gap.

51. The method of claim 50, wherein transmitting the measurement configuration comprises:
transmitting the measurement configuration indicating the self-measurement gap that is a periodic self-measurement gap, a semi-static self-measurement gap, a dynamic self-measurement gap, an event-triggered self-measurement gap, or any combination thereof.

52. The method of claim 34, wherein transmitting the measurement configuration comprises:
transmitting the measurement configuration indicating a frequency division multiplexing configuration, a code division multiplexing configuration, or both, for the shared resource.

53. The method of claim 52, further comprising:
receiving a measurement report indicating a downlink reference signal measurement, a reference signal measurement, or both, based at least in part on the frequency division multiplexing configuration, the code division multiplexing configuration, or both, for the shared resource.

54. The method of claim 35, wherein the first wireless device is one of a base station or a parent integrated access and backhaul node and the second wireless device is one of a user equipment or a child integrated access and backhaul node.

55. The method of claim 54, further comprising:
transmitting, from the base station, control signaling allocating a resource for uplink transmission, downlink transmission, or both, based at least in part on the measurement report; and
communicating the uplink transmission, downlink transmission, or both, within the resource based at least in part on the control signaling.

56. The method of claim 35, wherein the first wireless device is a central unit and the second wireless device is an integrated access and backhaul node.

57. The method of claim 56, further comprising:
receiving, from the central unit, control signaling allocating a resource for scheduling by the integrated access and backhaul node based at least in part on the measurement report; and
scheduling uplink transmission, downlink transmission, or both, within the resource.

58. An apparatus for wireless communications by a first wireless device, comprising:
a processor,
memory coupled with the processor; and
instructions stored in the memory and executable by the processor to cause the apparatus to:
receive a measurement configuration to support full duplex operation using a shared resource;
transmit, via the shared resource, a first signal via a first transmission beam using a first antenna array of the first wireless device;
monitor, in accordance with the measurement configuration, the shared resource using a first receive beam via a second antenna array of the first wireless device, the first receive beam being based at least in part on the measurement configuration; and
communicate with a second wireless device based at least in part on the monitoring.

59. An apparatus for wireless communications by a first wireless device, comprising:
a processor,
memory coupled with the processor; and
instructions stored in the memory and executable by the processor to cause the apparatus to:
transmit, to a second wireless device, a measurement configuration to support full duplex operation using a shared resource, wherein the measurement configuration is indicative of a first receive beam that is to be used for monitoring the shared resource by the second wireless device; and
communicate with the second wireless device based at least in part on the measurement configuration.

* * * * *